United States Patent
Ivans et al.

(10) Patent No.: US 12,084,175 B2
(45) Date of Patent: Sep. 10, 2024

(54) VARIABLE INCIDENCE WING AIRCRAFT HAVING A WING STOWAGE MODE

(71) Applicant: Textron Innovations Inc., Providence, RI (US)

(72) Inventors: Steven Ray Ivans, Ponder, TX (US); Kirk Landon Groninga, Keller, TX (US)

(73) Assignee: Textron Innovations Inc., Providence, RI (US)

( * ) Notice: Subject to any disclaimer, the term of this patent is extended or adjusted under 35 U.S.C. 154(b) by 55 days.

(21) Appl. No.: 17/720,089

(22) Filed: Apr. 13, 2022

(65) Prior Publication Data
US 2023/0331380 A1    Oct. 19, 2023

(51) Int. Cl.
*B64C 29/00* (2006.01)
*B64C 3/32* (2006.01)
*B64C 3/56* (2006.01)
*B64C 27/50* (2006.01)

(52) U.S. Cl.
CPC ............ *B64C 29/0033* (2013.01); *B64C 3/32* (2013.01); *B64C 3/56* (2013.01); *B64C 27/50* (2013.01)

(58) Field of Classification Search
CPC ........ B64C 29/0033; B64C 3/38; B64C 3/385
See application file for complete search history.

(56) References Cited

U.S. PATENT DOCUMENTS

| | | | | |
|---|---|---|---|---|
| 5,419,514 A | * | 5/1995 | Ducan | B64C 29/0033 244/23 B |
| 6,659,394 B1 | * | 12/2003 | Shenk | B64C 3/385 244/12.4 |
| 8,251,305 B2 | | 8/2012 | Smith et al. | |
| 8,567,709 B2 | | 10/2013 | Smith et al. | |
| 10,065,736 B2 | * | 9/2018 | Foskey | B64C 5/10 |
| 10,077,106 B2 | | 9/2018 | Foskey | |
| 10,086,936 B2 | | 10/2018 | Foskey | |
| 10,167,080 B2 | | 1/2019 | Foskey | |
| 10,196,127 B2 | | 2/2019 | Kooiman et al. | |
| 10,220,936 B2 | | 3/2019 | Kooiman et al. | |
| 10,343,762 B2 | | 7/2019 | Ross et al. | |
| 10,843,797 B2 | | 11/2020 | Foskey | |
| 2015/0266571 A1 | * | 9/2015 | Bevirt | B64C 39/068 244/7 C |

* cited by examiner

Primary Examiner — Philip J Bonzell
Assistant Examiner — Eric Acosta
(74) Attorney, Agent, or Firm — Lawrence Youst PLLC

(57) ABSTRACT

An aircraft includes a fuselage and a wing assembly that is rotatable between a substantially perpendicular orientation relative to the fuselage in flight modes and a substantially parallel orientation relative to the fuselage in a wing stowage mode. The wing assembly includes a wing that is pivotable between forward flight and VTOL orientations by a pivot angle. A distributed thrust array is coupled to the wing that includes outboard and inboard propulsion assemblies, each propulsion assembly having an axis of rotation that has a fixed angle relative to a chord axis of the wing. In a VTOL flight mode, the axis of rotation of each propulsion assembly is substantially vertical and the wing is in the VTOL orientation. In a forward flight mode, the wing is in the forward flight orientation and the axis of rotation of each propulsion assembly is tilted forward from the vertical by the pivot angle.

20 Claims, 15 Drawing Sheets

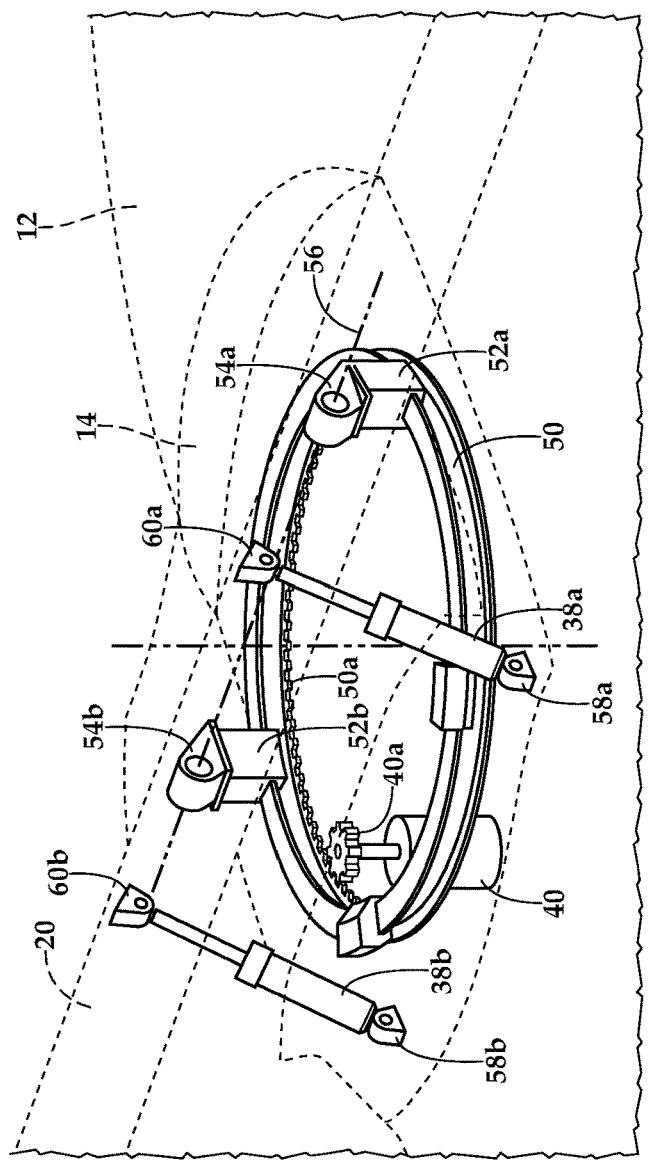
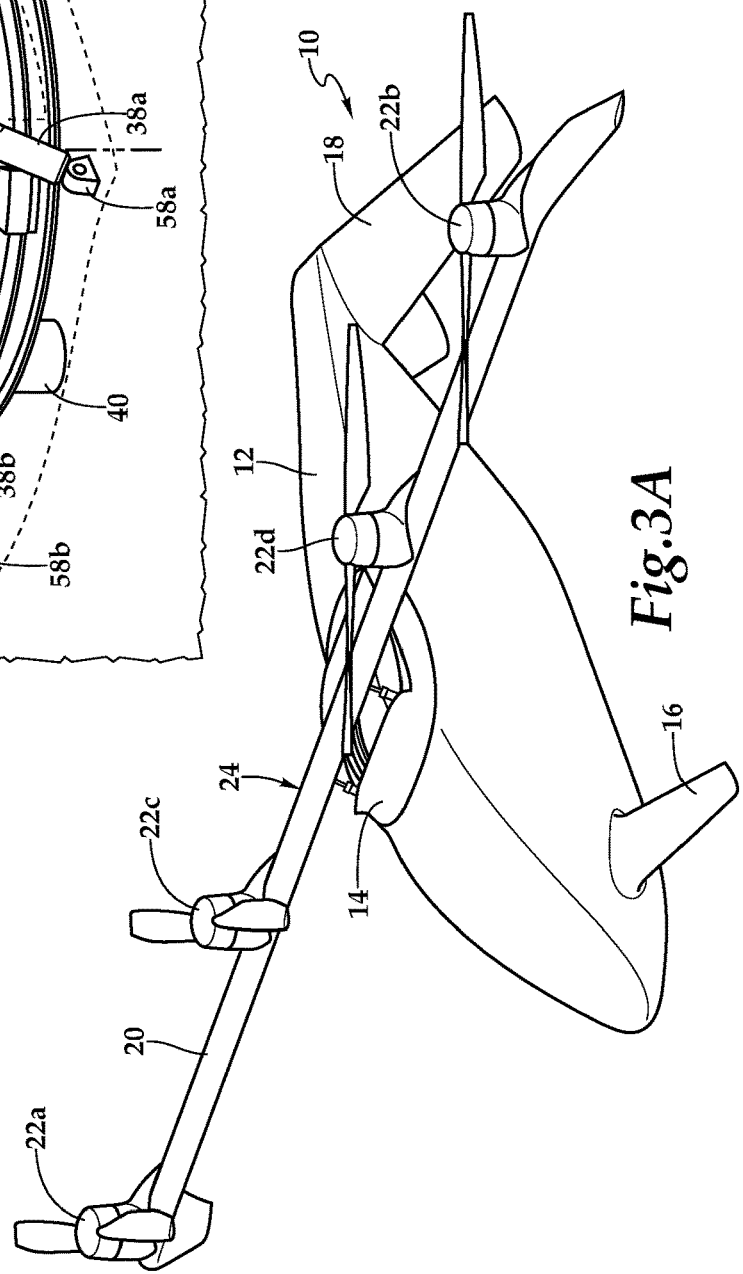
Fig.3B
Fig.3A

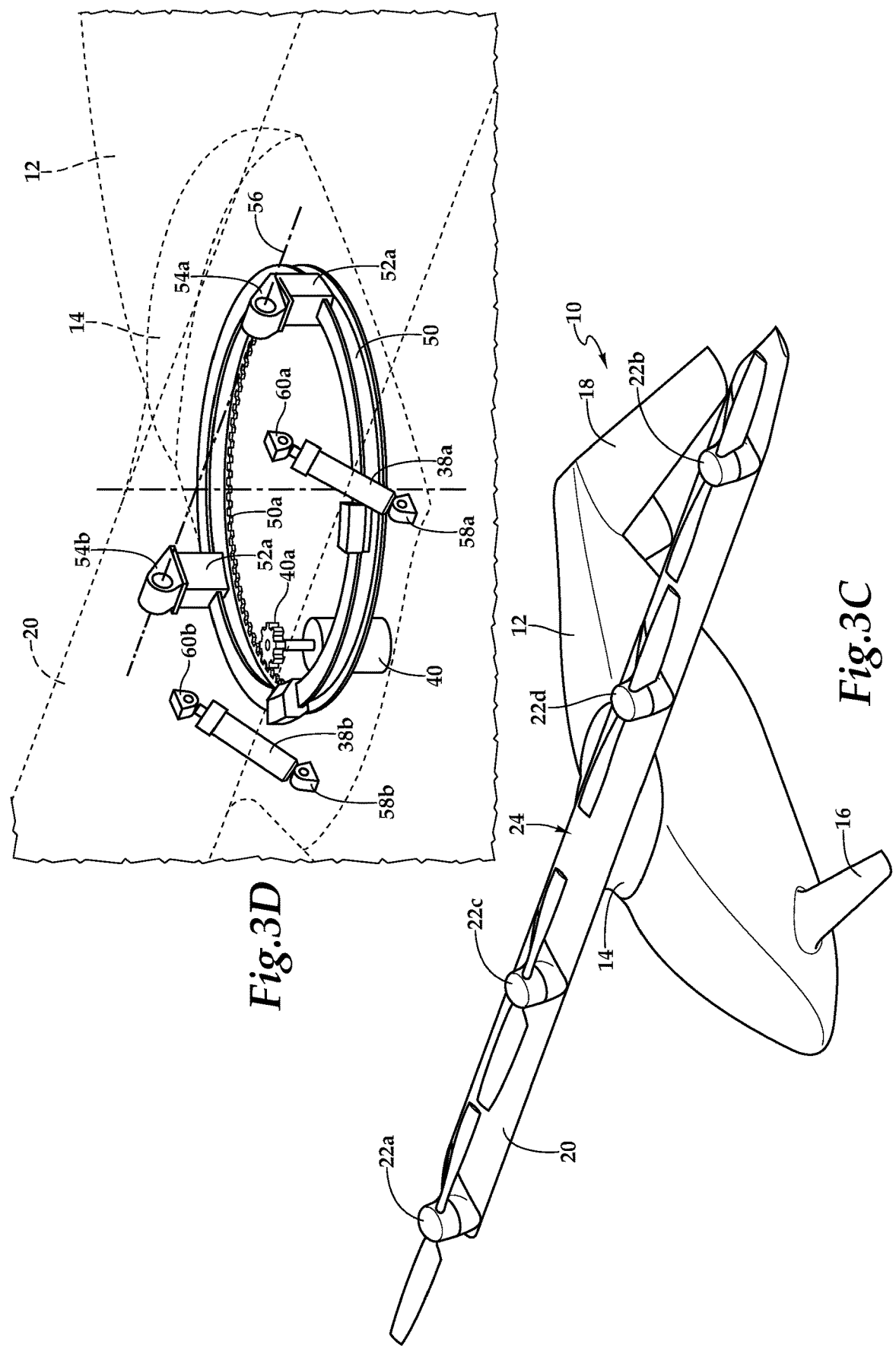

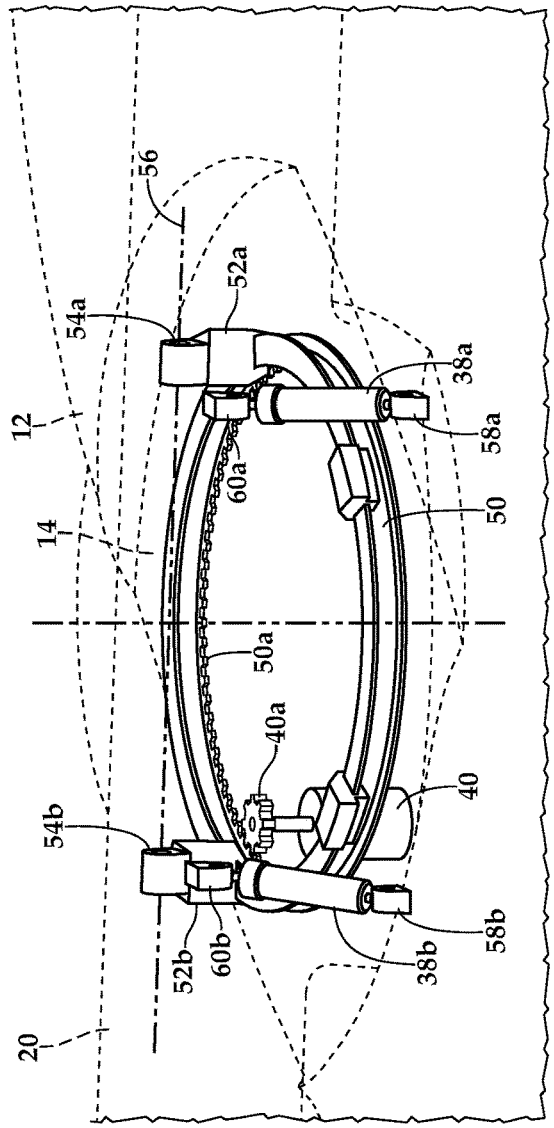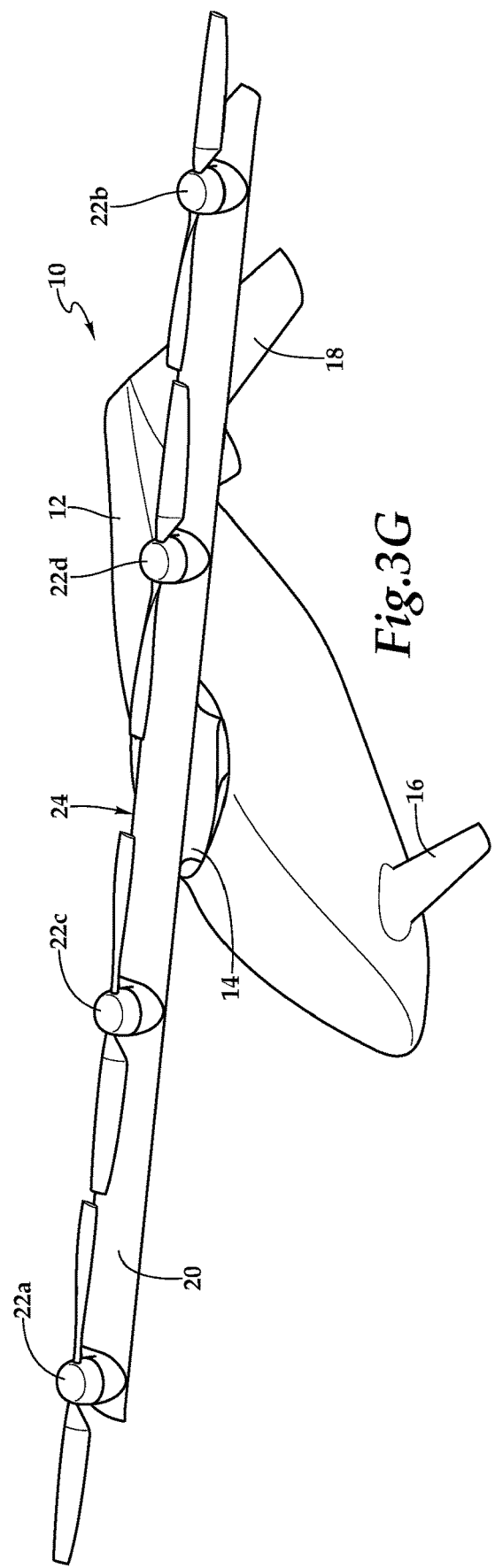

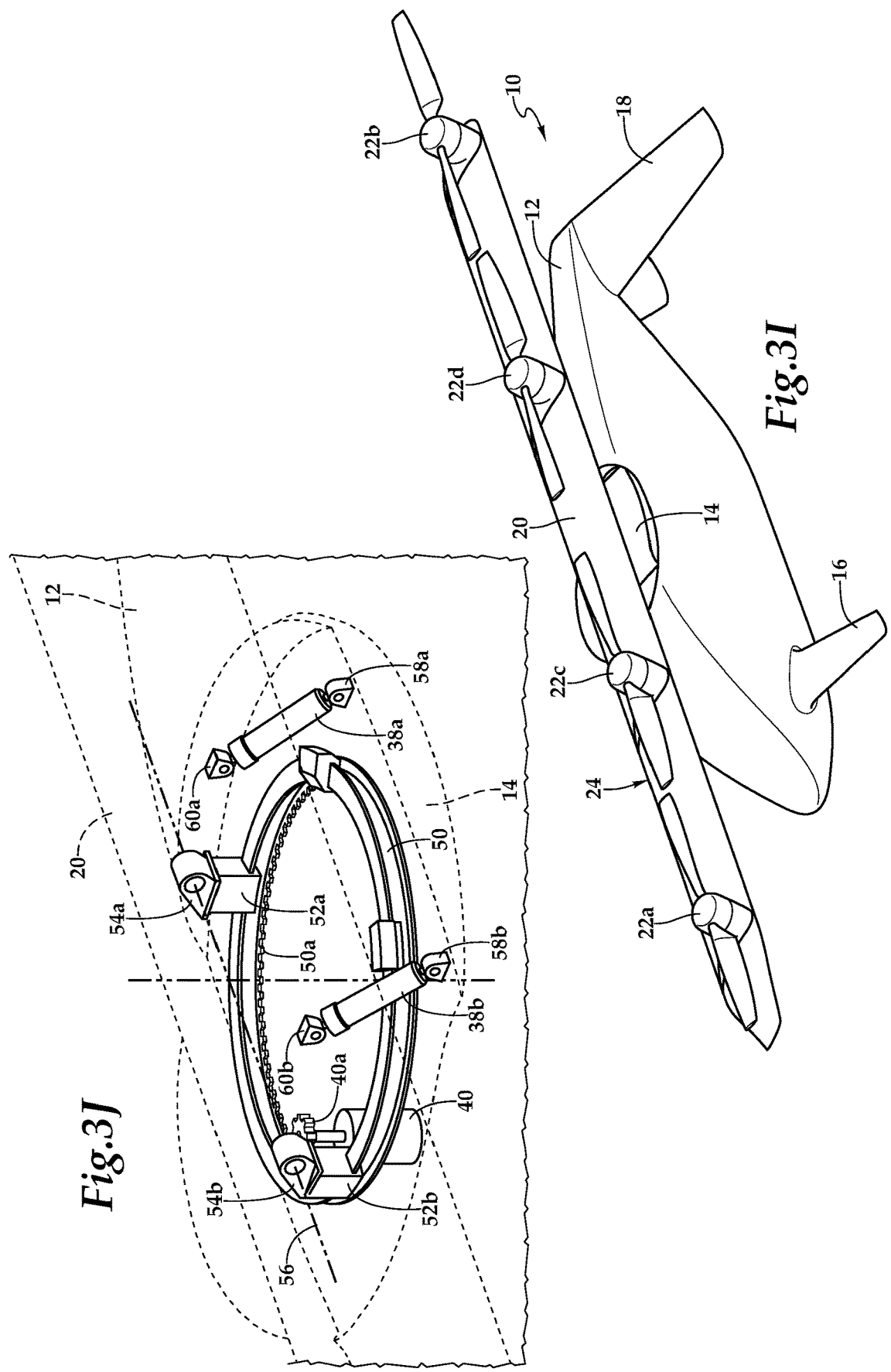

VARIABLE INCIDENCE WING AIRCRAFT HAVING A WING STOWAGE MODE

TECHNICAL FIELD OF THE DISCLOSURE

The present disclosure relates, in general, to variable incidence wing aircraft having a VTOL flight mode and a forward flight mode and, in particular, to variable incidence wing aircraft having a wing stowage mode that provides a reduced aircraft footprint for storage of the aircraft.

BACKGROUND

Fixed-wing aircraft, such as airplanes, are capable of flight using wings that generate lift responsive to the forward airspeed of the aircraft, which is generated by forward thrust from one or more jet engines or propellers. The wings generally have an airfoil cross section and generate a lifting force as the aircraft moves forward to support the aircraft in flight. Fixed-wing aircraft, however, typically require a runway that is hundreds or thousands of feet long for takeoff and landing. Unlike fixed-wing aircraft, vertical takeoff and landing (VTOL) aircraft do not require runways. Instead, VTOL aircraft are capable of taking off, hovering and landing vertically. One example of a VTOL aircraft is a helicopter, which is a rotorcraft having one or more rotors that provide lift and thrust to the aircraft. The rotors not only enable hovering and vertical takeoff and landing, but also enable forward, backward and lateral flight. While these attributes make helicopters highly versatile for use in congested, isolated or remote areas, helicopters typically lack the forward airspeed of fixed-wing aircraft due to the phenomena of retreating blade stall and advancing blade compression.

Attempts have been made to overcome this speed limitation with tiltrotor aircraft and tiltwing aircraft that utilize tiltable pylons and tiltable wings, respectively, that can change the plane of rotation of rotors based upon the operation being performed. Tiltrotor aircraft, for example, typically have a pair of nacelles mounted near the outboard ends of a fixed wing that are tiltable relative to the fixed wing such that the proprotors have a generally horizontal plane of rotation providing vertical thrust for takeoff, hovering and landing, much like a conventional helicopter, and a generally vertical plane of rotation providing forward thrust for cruising in forward flight with the fixed wing providing lift, much like a conventional propeller driven airplane. Tiltwing aircraft utilize a tiltable wing capable of tilting between a vertical orientation for VTOL flight and a horizontal orientation for forward flight. The wing typically has two or more rotor systems coupled thereto that are tilted with the wing such that the rotors provide vertical thrust when the wing is vertically orientated and forward thrust when the wing is horizontally orientated.

While tiltrotor and tiltwing aircraft provide improved forward airspeed compared to helicopters, existing tiltrotor and tiltwing aircraft have several drawbacks including the additional weight and complexity of the mechanisms and systems used to tilt the pylons or wings. In addition, tiltwing aircraft are difficult to control during hover as the vertically orientated wing provides a large surface area for crosswinds. Attempts have been made to overcome these complexity and control limitations of tiltrotor and tiltwing aircraft with variable incidence wing aircraft that utilize a wing that is pivotable relative to the fuselage between a VTOL flight mode and a forward flight mode. Variable incidence wing aircraft typically have a pair of rotors coupled to the wingtips of the wing at a fixed angle with respect to the chord of the wing such that in the VTOL flight mode, the rotors provide vertical lift and in the forward flight mode, the rotors provide forward propulsion. Unlike tiltrotor and tiltwing aircraft, however, that require ninety degrees of rotation of the pylons or wings to convert between VTOL and forward flight modes, variable incidence wing aircraft typically pivot the wing in the range of twenty-five degrees, thereby requiring much less complex mechanisms and systems for conversion between VTOL and forward flight modes.

SUMMARY

In a first aspect, the present disclosure is directed to an aircraft having a VTOL flight mode, a forward flight mode and a wing stowage mode. The aircraft includes a fuselage and a wing assembly that is rotatably mounted to the fuselage. The wing assembly is rotatable between a substantially perpendicular orientation relative to the fuselage in the flight modes and a substantially parallel orientation relative to the fuselage in the wing stowage mode. The wing assembly includes a wing that is pivotable between a forward flight orientation, at a first incidence angle relative to the fuselage, and a VTOL orientation, at a second incidence angle relative to the fuselage that is greater than the first incident angle by a pivot angle. A distributed thrust array is coupled to the wing. The thrust array includes at least two outboard propulsion assemblies and at least two inboard propulsion assemblies. Each of the propulsion assemblies has an axis of rotation that has a fixed angle relative to a chord axis of the wing. In the VTOL flight mode, the axis of rotation of each of the propulsion assemblies is substantially vertical and the wing is in the VTOL orientation. In the forward flight mode, the wing is in the forward flight orientation and the axis of rotation of each of the propulsion assemblies is tilted forward from the vertical by the pivot angle.

In certain embodiments, the pivot angle may be between twenty and thirty degrees such as approximately twenty-five degrees. In some embodiments, the thrust array may form a one-dimensional thrust array with the propulsion assemblies having an inline configuration. In other embodiments, the thrust array may form a two-dimensional thrust array such as having the outboard propulsion assemblies forward of the inboard propulsion assemblies or having the inboard propulsion assemblies forward of the outboard propulsion assemblies. In certain embodiments, each of the propulsion assemblies may include an electric motor and a rotor assembly with two fixed pitch rotor blades that are operable to change thrust output responsive to changes in rotational speed. In such embodiments, each of the rotor blades may be substantially parallel with the wing in the wing stowage mode. In some embodiments, a flight control system may be configured to independently control each of the propulsion assemblies and may be configured to control wing pivot between the VTOL orientation and the forward flight orientation.

In a second aspect, the present disclosure is directed to an aircraft having a VTOL flight mode, a forward flight mode and a wing stowage mode. The aircraft includes a fuselage and forward and aft wing assemblies that are rotatably mounted to the fuselage. The forward and aft wing assemblies are rotatable between substantially perpendicular orientations relative to the fuselage in the flight modes and substantially parallel orientations relative to the fuselage in the wing stowage mode. The forward wing assembly includes a forward wing that is pivotable between a forward flight orientation, at a first incidence angle relative to the fuselage, and a VTOL orientation, at a second incidence angle relative to the fuselage that is greater than the first incident angle by a forward pivot angle. The aft wing assembly includes an aft wing that is pivotable between a forward flight orientation, at a third incidence angle relative to the fuselage, and a VTOL orientation, at a fourth incidence angle relative to the fuselage that is greater than the third incident angle by an aft pivot angle. At least two propulsion assemblies are coupled to the forward wing and at least two propulsion assemblies are coupled to the aft wing. Each of the propulsion assemblies has an axis of rotation that has a fixed angle relative to a respective chord axis of the forward or aft wing. In the VTOL flight mode, the axis of rotation of each of the propulsion assemblies is substantially vertical and the forward and aft wings are in the VTOL orientations. In the forward flight mode, the forward and aft wings are in the forward flight orientations and the axis of rotation of each of the propulsion assemblies is tilted forward from the vertical by the respective pivot angle.

In some embodiments, the aft wing assembly may be above the forward wing assembly. In certain embodiments, the forward and aft pivot angles may be between twenty and thirty degrees such as approximately twenty-five degrees. In some embodiments, the forward pivot angle may be substantially the same as the aft pivot angle. In certain embodiments, the first incidence angle of the forward wing may be greater than the third incidence angle of the aft wing. In other embodiments, the first incidence angle of the forward wing may be substantially the same as the third incidence angle of the aft wing. In some embodiments, a flight control system may be configured to independently control each of the propulsion assemblies and may be configured to independently control pivoting of the forward and aft wings between the VTOL and forward flight orientations. In certain embodiments, the flight control system may be configured to pivot the forward and aft wings between the VTOL and forward flight orientations at the same time. In other embodiments, the flight control system may be configured to pivot the forward and aft wings between the VTOL and forward flight orientations sequentially.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 3A-3J are schematic illustrations of a variable incidence wing aircraft having a VTOL flight mode, a forward flight mode and a wing stowage mode in sequential wing pivot and stowage scenarios in accordance with embodiments of the present disclosure;

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1B:
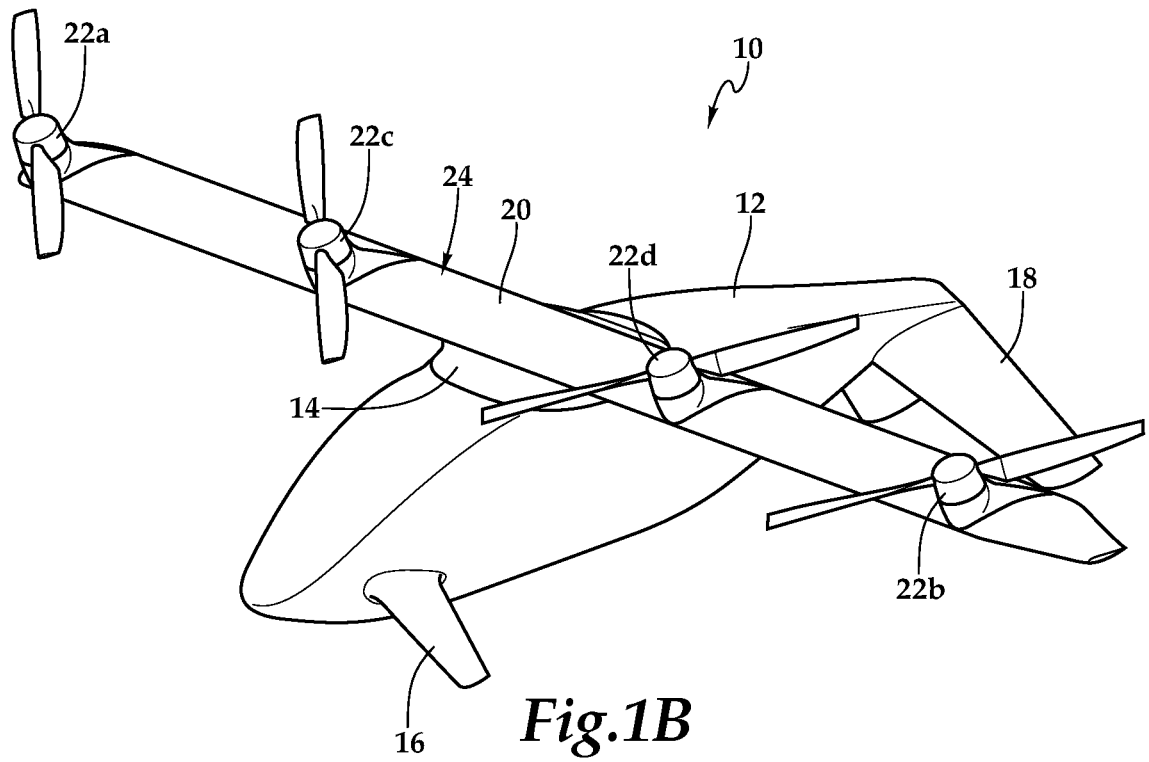
FIGS. 1A-1F are schematic illustrations of an exemplary variable incidence wing aircraft having a VTOL flight mode, a forward flight mode and a wing stowage mode in accordance with embodiments of the present disclosure.
Figure 1A:
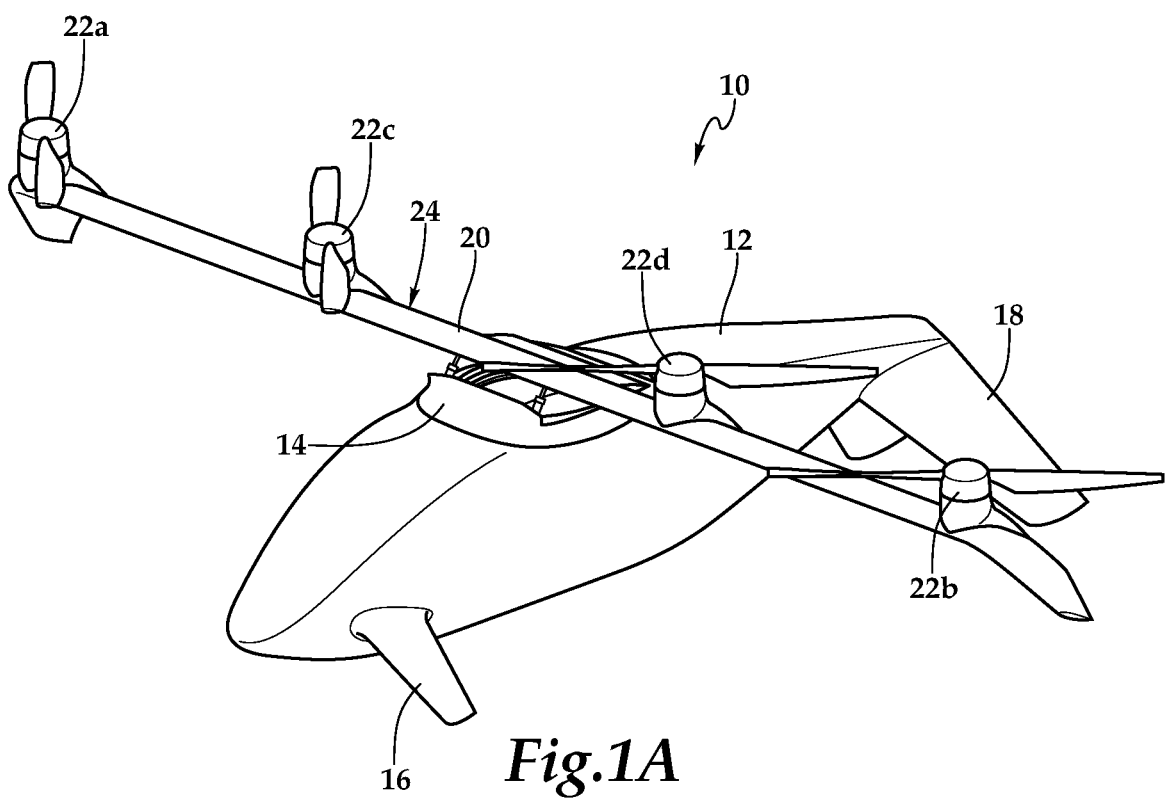
Figure 1D:
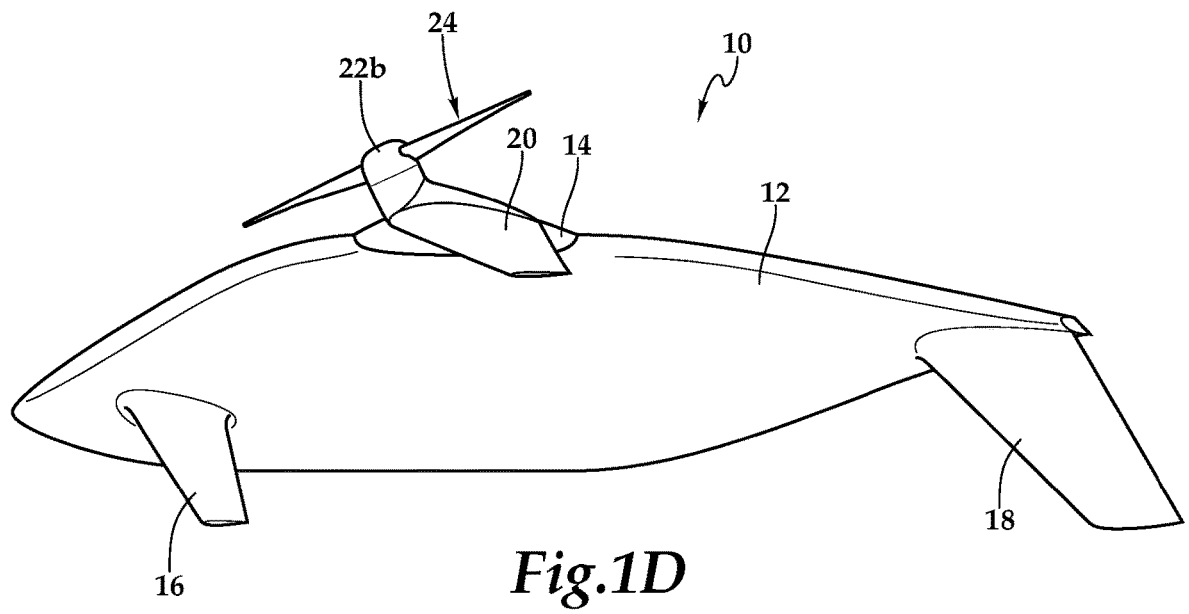
Figure 1C:
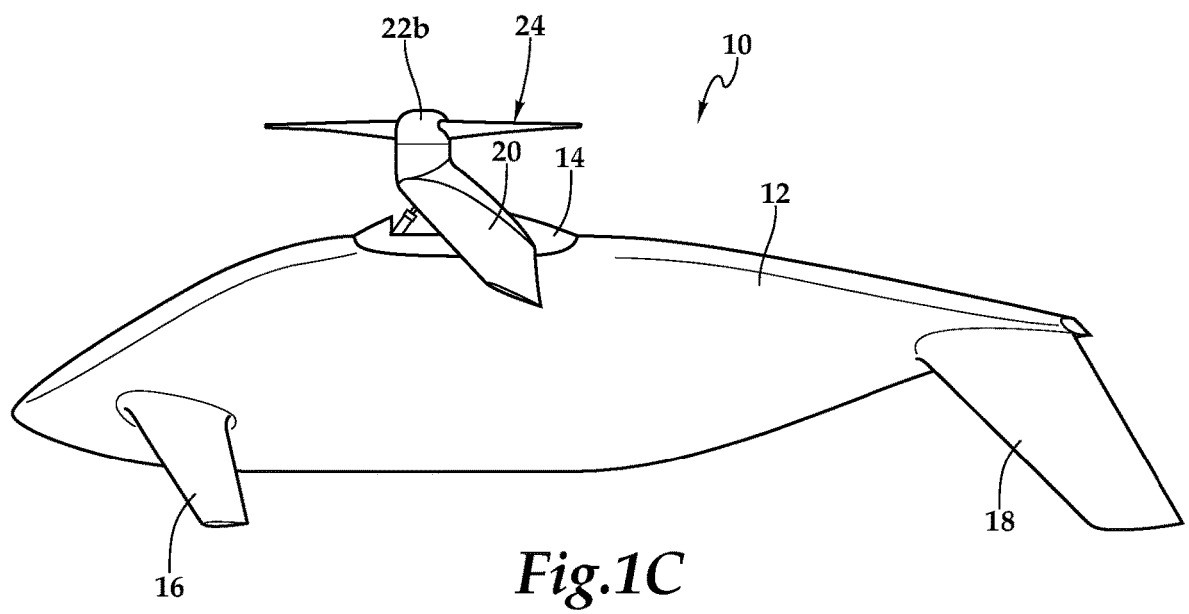
Figure 1F:
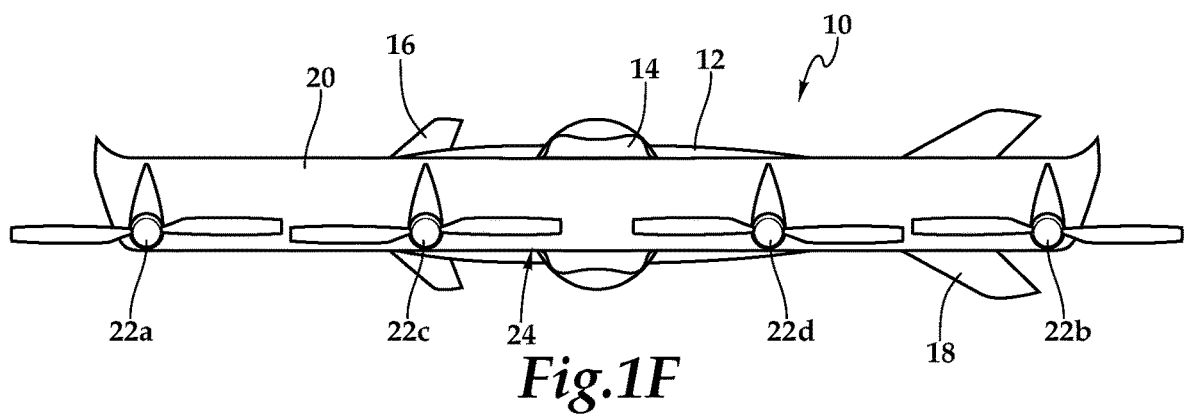
Figure 1E:
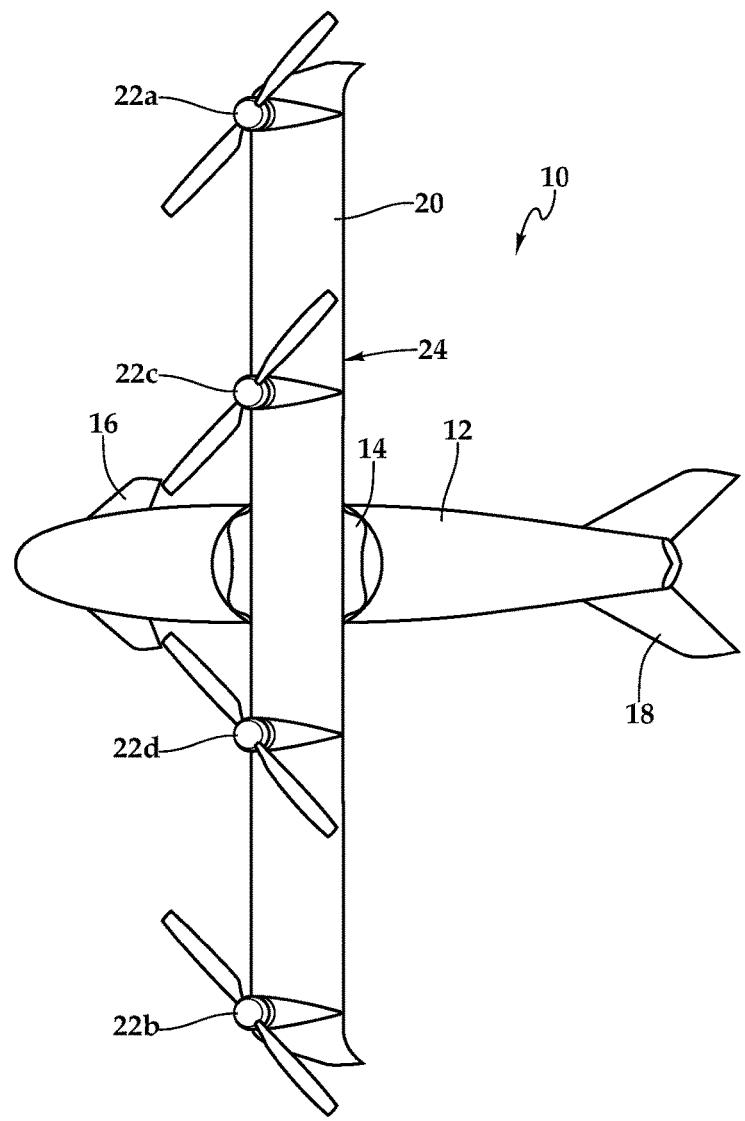

Referring to FIGS. 1A-1F in the drawings, a variable incidence wing aircraft having a VTOL flight mode, a forward flight mode and a wing stowage mode is schematically illustrated and generally designated 10. Aircraft 10 includes a fuselage 12, a wing mount assembly 14 that is rotatable relative to fuselage 12, forewings 16 that provide static and dynamic stability to aircraft 10 and a tail assembly 18 having optional control surfaces for horizontal and/or vertical stabilization of aircraft 10. A wing 20 is supported by wing mount assembly 14 and rotates with wing mount assembly 14 relative to fuselage 12 such that wing 20 has a substantially perpendicular orientation relative to fuselage 12, as best seen in FIGS. 1A-1E, for the flight modes of aircraft 10 and a substantially parallel orientation relative to fuselage 12, as best seen in FIG. 1F, for the wing stowage mode of aircraft 10. Located at outboard stations of wing 20 are outboard propulsion assemblies 22a, 22b. Located at inboard stations of wing 20 are inboard propulsion assemblies 22c, 22d. In this configuration, propulsion assemblies 22a, 22b, 22c, 22d form a one-dimensional distributed thrust array of inline propulsion assemblies. Together, wing mount assembly 14, wing 20 and propulsion assemblies 22a, 22b, 22c, 22d may be referred to herein as a wing assembly 24.

Each of propulsion assembly 22a, 22b, 22c, 22d has an axis of rotation that is fixed relative to a chord axis of wing 20, as discussed herein. Wing 20 is pivotable between a VTOL orientation, as best see FIGS. 1A and 1C, and a forward flight orientation, as best seen in FIGS. 1B and 1D. Wing 20 has a greater incidence angle relative to fuselage 12 in the VTOL orientation than in the forward flight orientation with the difference in the incidence angle between the VTOL orientation and the forward flight orientation being referred to herein as the pivot angle. For example, the pivot angle may be between twenty and thirty degrees such as approximately twenty-five degrees. In the forward flight mode of aircraft 10, the incidence angle of wing 20 relative to fuselage 12 is at a minimum. With the incidence angle measured between the chord axis of wing 20 and the longitudinal axis of aircraft 10, this minimum incidence angle is preferably between zero and ten degrees, such as five degrees but may be another suitable incidence angle. In the VTOL flight mode, the incidence angle of wing 20 is at a maximum and is equal to the minimum incidence angle plus the pivot angle of wing 20. For example, if the minimum incidence angle is five degrees and pivot angle is twenty-five degrees, the incidence angle of wing 20 in the VTOL flight mode is thirty degrees. In the VTOL flight mode, the axis of rotation of each of propulsion assemblies 22a, 22b, 22c, 22d is substantially vertical. As the axis of rotation of each of propulsion assemblies 22a, 22b, 22c, 22d has a static orientation relative to the chord axis of wing 20, when aircraft 10 is in the forward flight mode, the axis of rotation of each of propulsion assemblies 22a, 22b, 22c, 22d is pivoted forward relative to the vertical by the pivot angle which, in the example above, is twenty-five degrees. When the axis of rotation of each of propulsion assemblies 22a, 22b, 22c, 22d is pivoted forward, the thrust generated by propulsion assemblies 22a, 22b, 22c, 22d has a forward component thus providing aircraft 10 with forward mobility. In this configuration, wing 20 offloads at least a portion of the lift requirement for aircraft 10 based upon the forward airspeed of aircraft 10.

In the illustrated embodiment, each of propulsion assemblies 22a, 22b, 22c, 22d is depicted as including a rotor assembly having two fixed pitch rotor blades. In this embodiment, the thrust output of each of propulsion assemblies 22a, 22b, 22c, 22d is controlled responsive to changes in rotational speed. Having two rotor blades on each rotor assembly has the advantage of not requiring blade folding in the stowage mode of aircraft 10 as the rotor blades can be aligned with wing 20 (see FIG. 1F) such that the rotor blade may be referred to as non-folding rotor blades. In other embodiments, the rotor assemblies for a variable incidence wing aircraft of the present disclosure could have other numbers of rotor blade in other configurations including rotor assemblies having a collective pitch degree of freedom and/or rotor blades having a folding degree of freedom. Preferably, certain of propulsion assemblies 22a, 22b, 22c, 22d rotate in opposite directions to provide torque balancing to aircraft 10. For example, propulsion assemblies 22a, 22c may rotates clockwise while propulsion assemblies 22b, 22d rotate counterclockwise. In addition, even though aircraft 10 has been described and depicted as having four propulsion assemblies 22a, 22b, 22c, 22d, it should be understood by those having ordinary skill in the art that a variable incidence wing aircraft of the present disclosure could have other numbers of propulsion assemblies both greater than or less than four such as six propulsion assemblies or eight propulsion assemblies.

Figure 2:
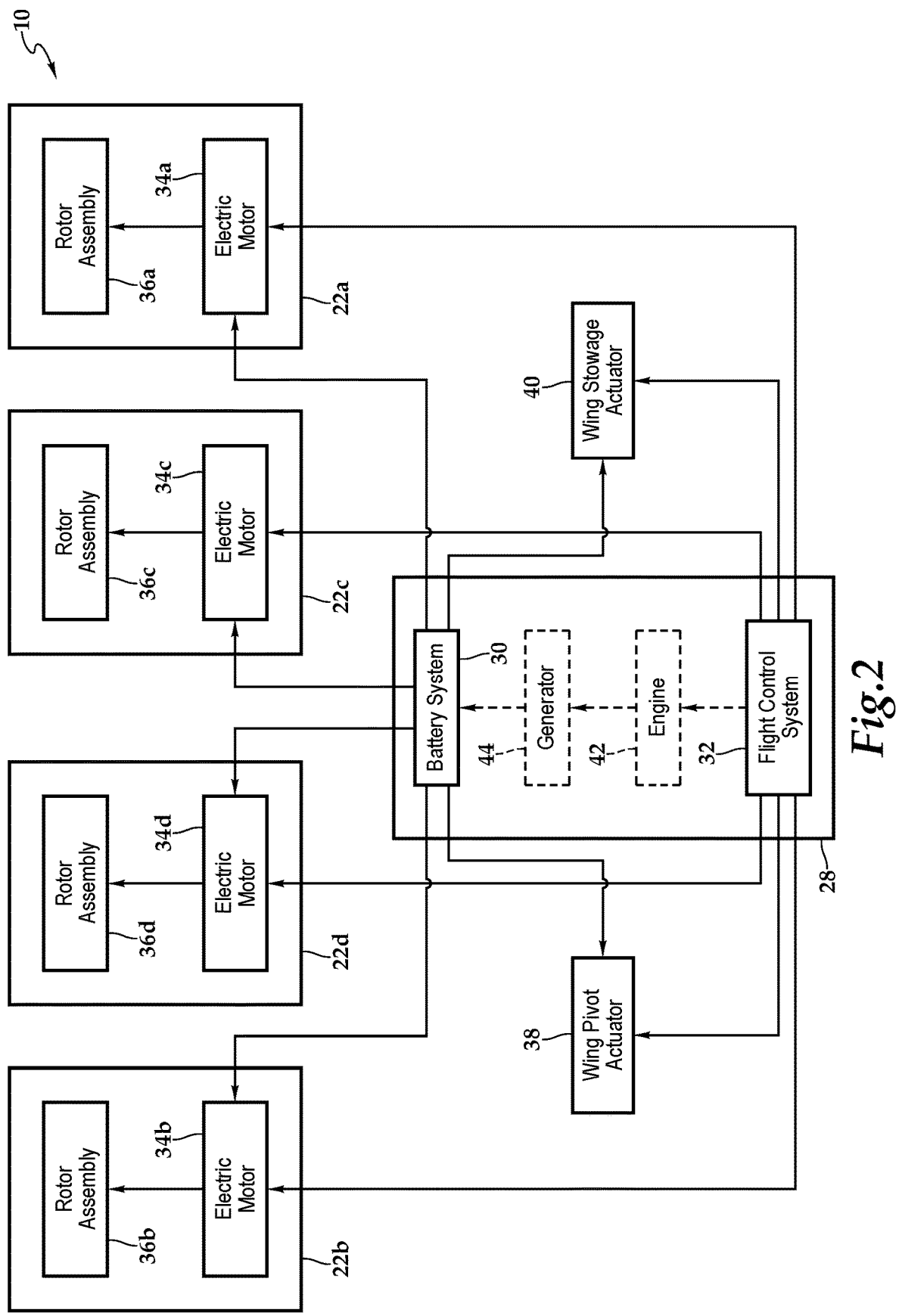
FIG. 2 is a systems diagram of a variable incidence wing aircraft having a VTOL flight mode, a forward flight mode and a wing stowage mode in accordance with embodiments of the present disclosure.

Referring additional to FIG. 2 in the drawings, a block diagram depicts various systems of variable incidence wing aircraft 10. Aircraft 10 includes outboard propulsion assemblies 22a, 22b and inboard propulsion assemblies 22c, 22d. Aircraft 10 also includes a power and control system 28 depicted as including a battery system 30 and a flight control system 32. In the illustrated embodiment, propulsion assembly 22a includes an electric motor 34a and a rotor assembly 36a, propulsion assembly 22b includes an electric motor 34b and a rotor assembly 36b, propulsion assembly 22c includes an electric motor 34c and a rotor assembly 36c and propulsion assembly 22d includes an electric motor 34d and a rotor assembly 36d. Electric motors 34a, 34b, 34c, 34d receive power from battery system 30 and control commands from flight control system 32. For example, in order to individually control the thrust output from each of propulsion assemblies 22a, 22b, 22c, 22d, flight control system 32 sends commands to electric motors 34a, 34b, 34c, 34d to adjust the rotational speed of rotor assemblies 36a, 36b, 36c, 36b. Preferably, each electric motor is positioned along the rotational axis of the respective propulsion assembly inline with the rotor assembly. Battery system 30 and flight control system 32 are preferably housed within fuselage 12. Optionally, the power system of aircraft 10 could be a hybrid power system in which an internal combustion engine 42 drives a generator 44 that charges the batteries of battery system 30 during flight. Even though aircraft 10 has been depicted and described as having a single electric motor associated with each propulsion assembly, it should be understood by those having ordinary skill in the art that an aircraft of the present disclosure could have a single electric motor driving more than one propulsion assembly or could have more than one electric motor driving a single propulsion assembly. Also, even though aircraft 10 has been depicted and described as having a common battery system 30 for providing electrical energy to each of the propulsion assemblies, it should be understood by those having ordinary skill in the art that an aircraft of the present disclosure could have a distributed power system in which each propulsion assembly has one or more dedicated batteries.

In order to transition wing 20 of aircraft 10 between the VTOL orientation and the forward flight orientation, aircraft 10 includes a wing pivot actuator 38 that is preferably housed within wing mount assembly 14. In the illustrated embodiment, wing pivot actuator 38 receives power from battery system 30 and sequencing instructions from flight control system 32 to pivot wing 20. Wing pivot actuator 38 may be one or more electro-mechanical linear actuators such as ball screw actuators. Alternatively, wing pivot actuator 38 may be one or more hydraulic linear actuators or one or more pneumatic linear actuators. In order to transition wing 20 of aircraft 10 between the flight modes and the stowage mode, aircraft 10 includes wing a stowage actuator 40 that is coupled between fuselage 12 and wing mount assembly 14. In the illustrated embodiment, wing stowage actuator 40 receives power from battery system 30 and sequencing instructions from flight control system 32 to rotate wing 20 relative to fuselage 12. Wing stowage actuator 40 may be one or more electro-mechanical rotary actuators. Alternatively, wing stowage actuator 40 may be one or more hydraulic rotary actuators or one or more pneumatic rotary actuators. As yet another alternative, wing stowage actuator 40 may be one or more electro-mechanical, hydraulic or pneumatic linear actuators.

Figure 3F:
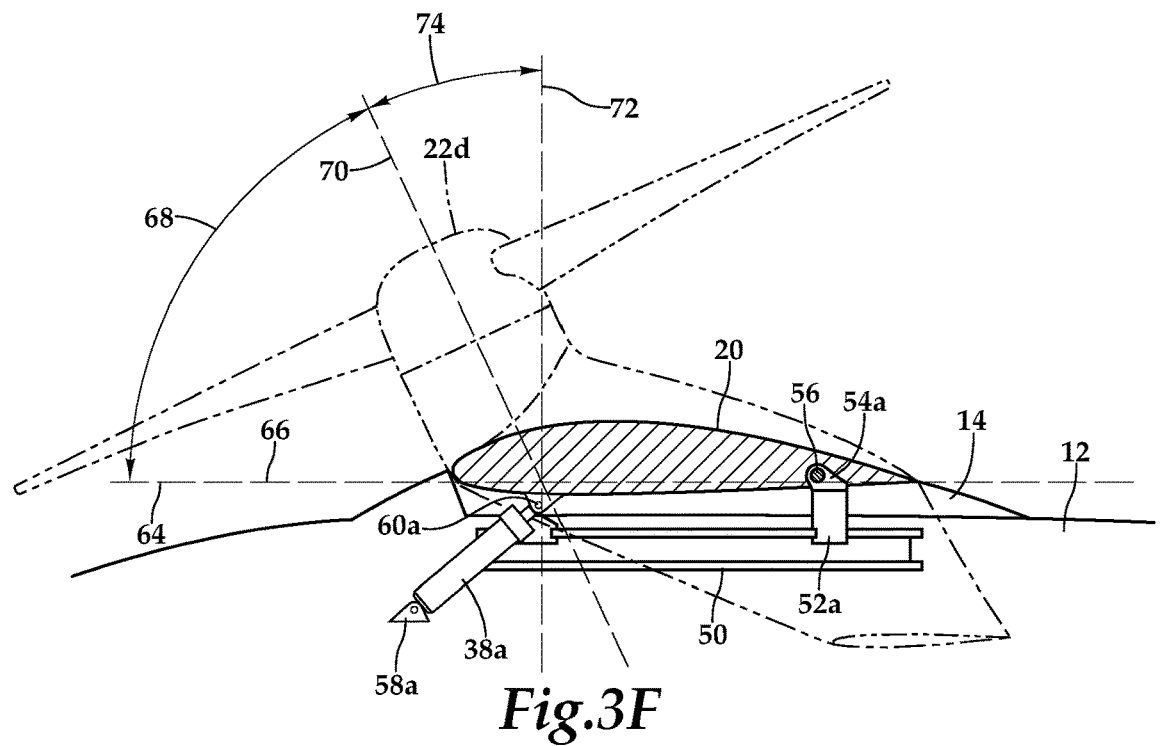
Figure 3E:
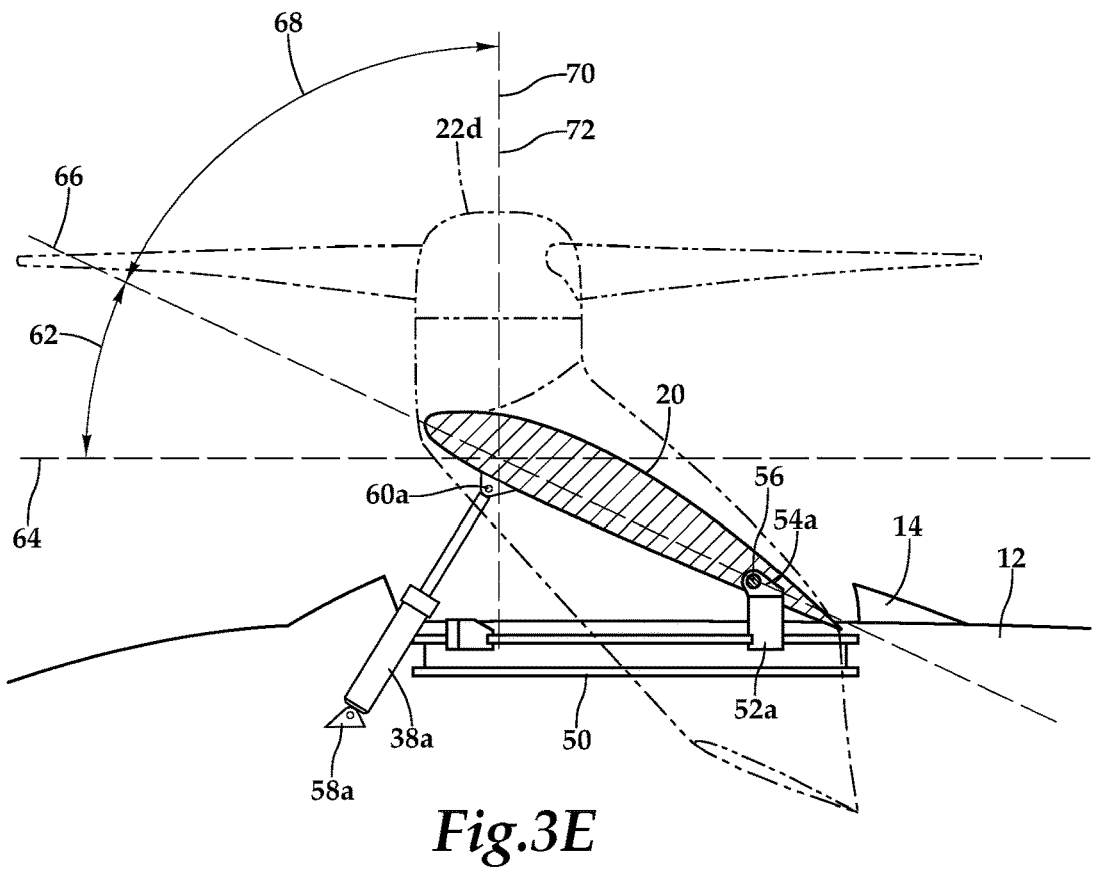

The pivoting and rotating operations of wing 20 will now be described in greater detail with reference to FIGS. 3A-3J. FIGS. 3A-3F depict wing 20 in flight modes of aircraft 10 with FIGS. 3A, 3B and 3E depicting wing 20 in the VTOL orientation and FIGS. 3C, 3D and 3F depicting wing 20 in the forward flight orientation. FIGS. 3I-3J depict wing 20 in the stowage mode of aircraft 10 with FIGS. 3G-3H depicting wing 20 during transition between the flight and stowage modes of aircraft 10. Referring to FIG. 3B, wing mount assembly 14 includes a turntable 50 having a rotational degree of freedom relative to fuselage 12. Turntable 50 includes in supports 52a, 52b that are respectively coupled to wing 20 via bearings 54a, 54b that define a pivot axis 56 for wing 20. Operably positioned between wing mount assembly 14 and wing 20 is wing pivot actuator 38 depicted as linear actuators 38a, 38b that are respectively coupled between lugs 58a, 58b of wing mount assembly 14 and lugs 60a, 60b of wing 20.

As best seen in FIGS. 3E-3F, responsive to power from battery system 30 and sequencing instructions from flight control system 32, linear actuators 38a, 38b are configured to stroke between extended positions (see FIG. 3E) and contracted positions (see FIG. 3F) to pivot wing 20 between the VTOL and forward flight orientations. In the illustrated embodiment, wing 20 is pivoted through a pivot angle 62 of approximately twenty-five degrees between the VTOL orientation (see FIG. 3E) and forward flight orientation (see FIG. 3F). In other embodiments, pivot angle 62 may be in the range of twenty to thirty degrees or other suitable pivot angle. In the illustrated embodiment, the incident angle of wing 20 relative to fuselage 12 is zero in the forward flight orientation such that a horizontal axis 64, which is parallel to the longitudinal axis of aircraft 10, is common with a chord axis 66 of wing 20, as best seen in FIG. 3F. Thus, pivot angle 62 can be determined by measuring the angle between chord axis 66 of wing 20 and the horizontal axis 64 in the VTOL orientation, as best seen in FIG. 3E.

The angle 68 between the axis of rotation 70 of propulsion assembly 22d and chord axis 66 of wing 20 is constant. Noting that the relationship of propulsion assembly 22d and wing 20 is substantially similar to the relationship between each of the propulsion assemblies and wing 20, for sake of efficiency, certain features will be disclosed only with regard to propulsion assembly 22d and wing 20. One having ordinary skill in the art, however, will fully appreciate an understanding of the relationship between each of the propulsion assemblies and wing 20 based upon the disclosure herein of propulsion assembly 22d and wing 20. In the illustrated embodiment, angle 68 between the axis of rotation 70 of propulsion assembly 22d and chord axis 66 of wing 20 is approximately sixty-five degrees. In other embodiments, angle 68 may be greater than or less than sixty-five degrees depending upon the incident angle of wing 20 relative to fuselage 12 in the forward flight orientation and pivot angle 62. As illustrated in FIG. 3E, in the VTOL orientation, the axis of rotation 70 of propulsion system 22d is preferably coincident with the vertical axis 72. This results in a forward angle 74 of the axis of rotation 70 of propulsion system 22d relative to the vertical axis 72 that is congruent with pivot angle 62, which is approximately twenty-five degrees in the present example. In this manner, the thrust provided by propulsion system 22d is substantially vertical in the VTOL orientation and the thrust provided by propulsion system 22d in the forward flight orientation has a forward component that enables forward flight of aircraft 10.

Referring to FIG. 3D, operably positioned between wing mount assembly 14 and fuselage 12 is wing stowage actuator 40 depicted as a rotary actuator having an output gear 40a that meshes with a tooth pattern 50a on an inner portion of turntable 50. As best seen in progression of FIGS. 3C-3D, 3G-3H and 3I-3J, responsive to power from battery system 30 and sequencing instructions from flight control system 32, wing stowage actuator 40 is configured to rotate wing 20 between the flight modes of aircraft 10, substantially perpendicular to fuselage 12 (see FIG. 3C) and the stowage mode of aircraft 10, substantially parallel to fuselage 12 (see FIG. 3I). In the illustrated embodiment, wing 20 is rotated through a wing stowage angle of approximately ninety degrees. In the stowage mode of aircraft 10, the footprint of aircraft 10 is significantly reduced enabling, for example, transportation of aircraft 10 in a shipping container. As illustrated, the rotor blades of propulsion assemblies 22a, 22b, 22c, 22d are preferably clocked to be substantially parallel with wing 20 in the stowage mode of aircraft 10.

Figure 4:
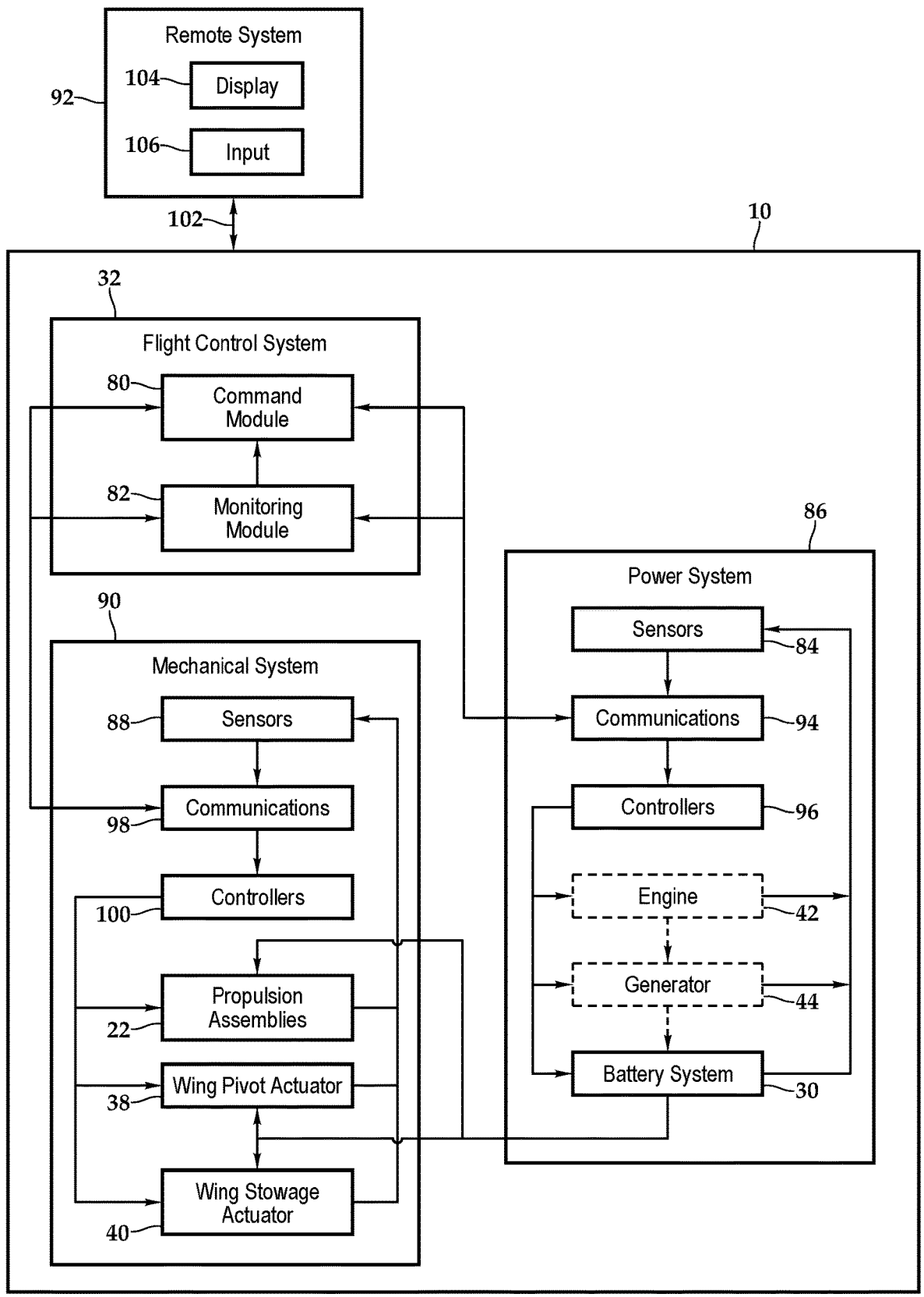
FIG. 4 is a systems diagram of a variable incidence wing aircraft having a VTOL flight mode, a forward flight mode and a wing stowage mode in accordance with embodiments of the present disclosure.

Referring to FIG. 4 in the drawings, a systems diagram depicts variable incidence wing aircraft 10. Aircraft 10 may be operated autonomously responsive to commands generated by flight control system 32. In the illustrated embodiment, flight control system 32 includes a command module 80 and a monitoring module 82. It is to be understood by those having ordinary skill in the art that these and other modules executed by flight control system 32 may be implemented in a variety of forms including hardware, software, firmware, special purpose processors and combinations thereof. Flight control system 32 receives input from a variety of sources including sensors 84 of power system 86 and sensors 88 of mechanical system 90. Flight control system 32 may also receive input from external sources such as remote system 92, global positioning systems and the like. In the illustrated embodiment, power system 86 includes sensors 84, communications 94, controllers 96, battery system 30 and optionally, engine 42 and generator 44 as well as other components required for power generation that are known to those skilled in the art. Mechanical system 90 include sensors 88, communications 98, controllers 100, propulsion assemblies 22, wing pivot actuator 38, wing stowage actuator 40 and other components required for operating an aircraft that are known to those skilled in the art.

In one operational example, flight control system 32 may receive a flight plan from an external source, such as a command and control station, to perform a mission. Thereafter, in both manned and unmanned missions, flight control system 32 may autonomously control all aspects of flight of aircraft 10. During the various operating modes of aircraft 10 including the VTOL flight mode, the forward flight mode and transitions therebetween, to name a few, command module 80 provides commands to controllers 96 of power system 86 and controllers 100 of mechanical systems 90 to establish the desired operating parameters for wing 20 and propulsion assemblies 22. Flight control system 32 receives feedback from sensors 84 of power system 86 and sensors 88 of mechanical system 90. This feedback is processes by monitoring module 82, which supplies correction data and other information to command module 80. Monitoring module 82 preferably receives and processes information from additional aircraft sensors (not shown), such as positioning sensors, attitude sensors, speed sensors, environmental sensors, fuel sensors, temperature sensors, location sensors and the like. Monitoring module 82 provides the processed information to command module 80 to further enhance autonomous flight control capabilities.

Some or all of the autonomous control capability of flight control system 32 may be augmented or supplanted by remote flight control system 92. Remote system 92 may include one or computing systems that may be implemented on general-purpose computers, special purpose computers or other machines with memory and processing capability. For example, the computing systems may include one or more memory storage modules including, but is not limited to, internal storage memory such as random access memory, non-volatile memory such as read only memory, removable memory such as magnetic storage memory, optical storage memory, solid-state storage memory or other suitable memory storage entity. The computing systems may be microprocessor-based systems operable to execute program code in the form of machine-executable instructions. In addition, the computing systems may be connected to other computer systems via a proprietary encrypted network, a public encrypted network, the Internet or other suitable communication network that may include both wired and wireless connections. Remote system 92 communicates with flight control system 32 via a communication link 102 that may include both wired and wireless connections.

Remote system 92 preferably includes one or more display devices 104 configured to display information relating to one or more aircraft of the present disclosure. Remote system 92 may also include audio output and input devices such as a microphone, speakers and/or an audio port allowing an operator to communicate with, for example, an operator of another remote system of the present disclosure. The display device 104 may also serve as an input device 106 if a touch screen display implementation is used, however, other input devices, such as a keyboard or joysticks, may alternatively be used to allow an operator to provide control commands to an aircraft being operated responsive to remote system 92. As another alternative, some or all aspects of the flight operations of aircraft 10 may be controlled by an onboard pilot.

Figure 5B:
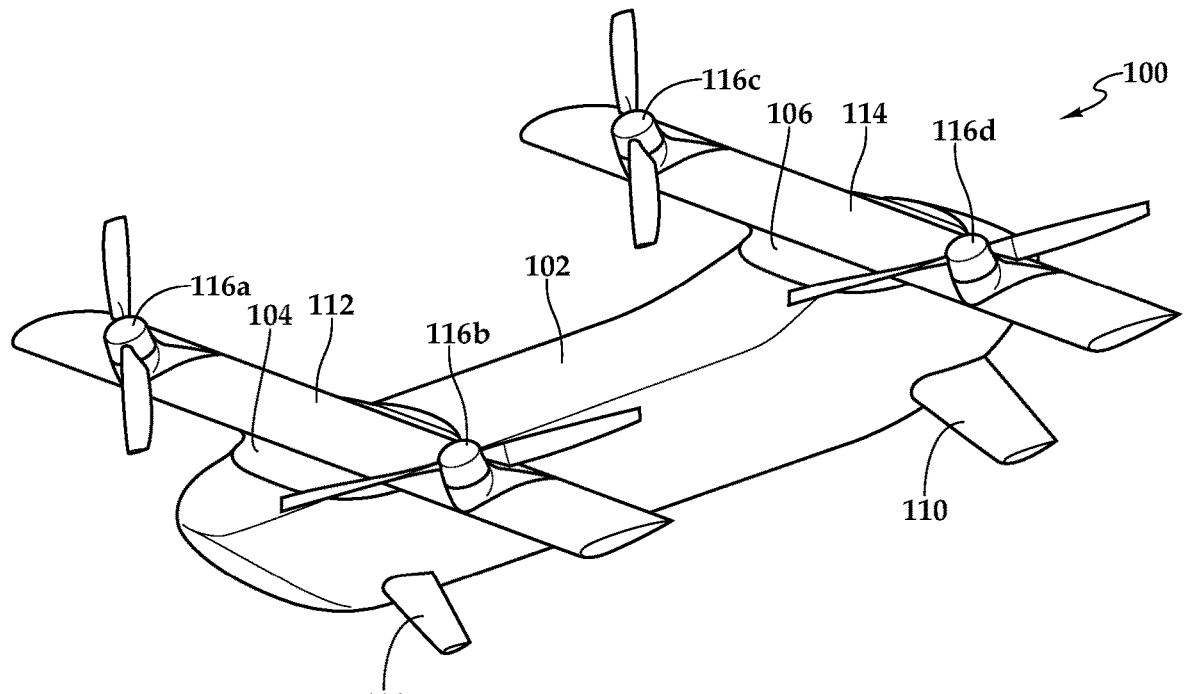
FIGS. 5A-5H are schematic illustrations of an exemplary variable incidence wing aircraft having a VTOL flight mode, a forward flight mode and a wing stowage mode in accordance with embodiments of the present disclosure.
Figure 5A:
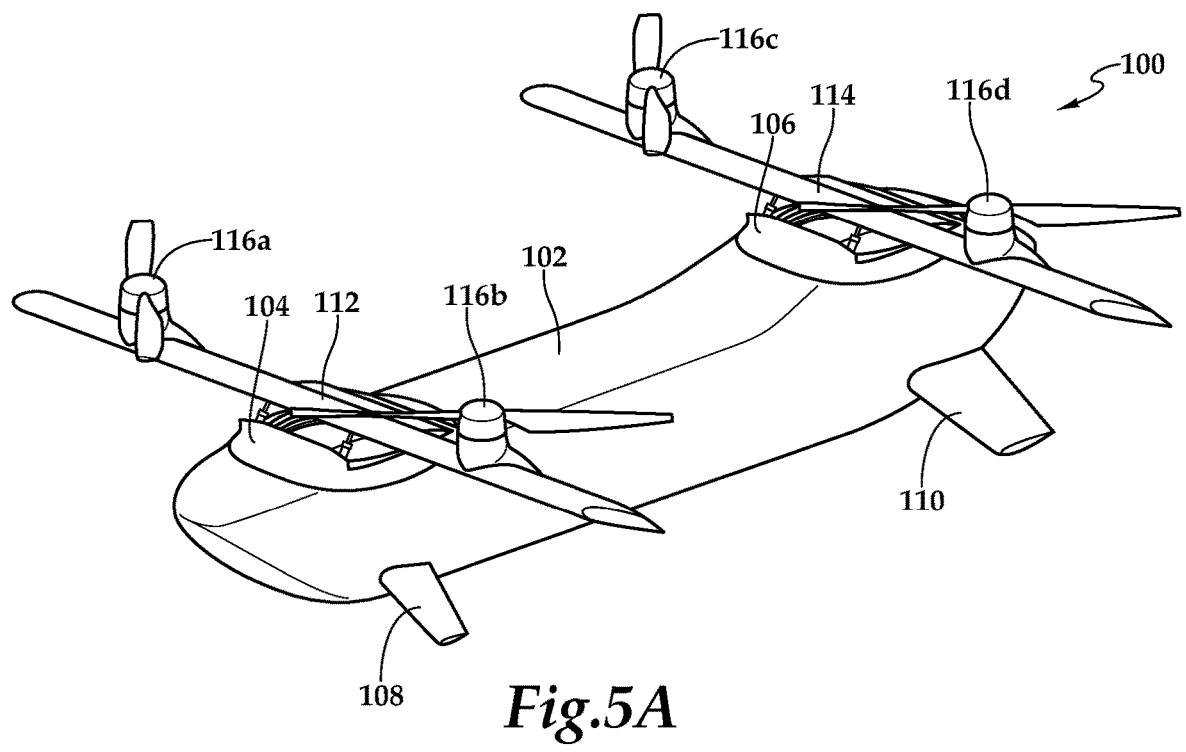
Figure 5D:
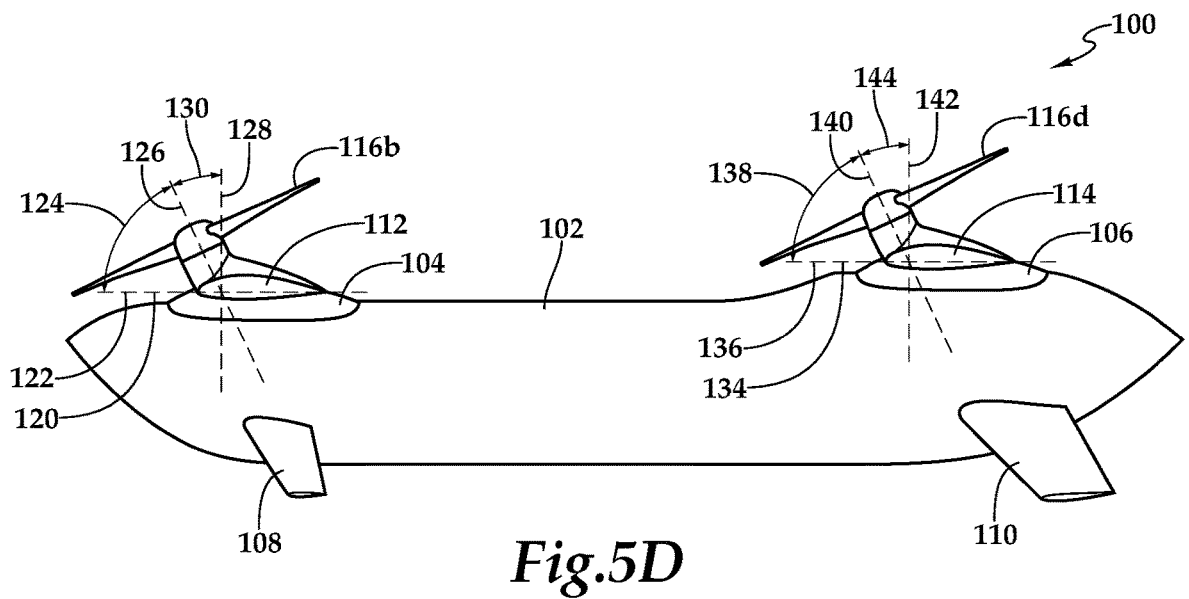
Figure 5C:
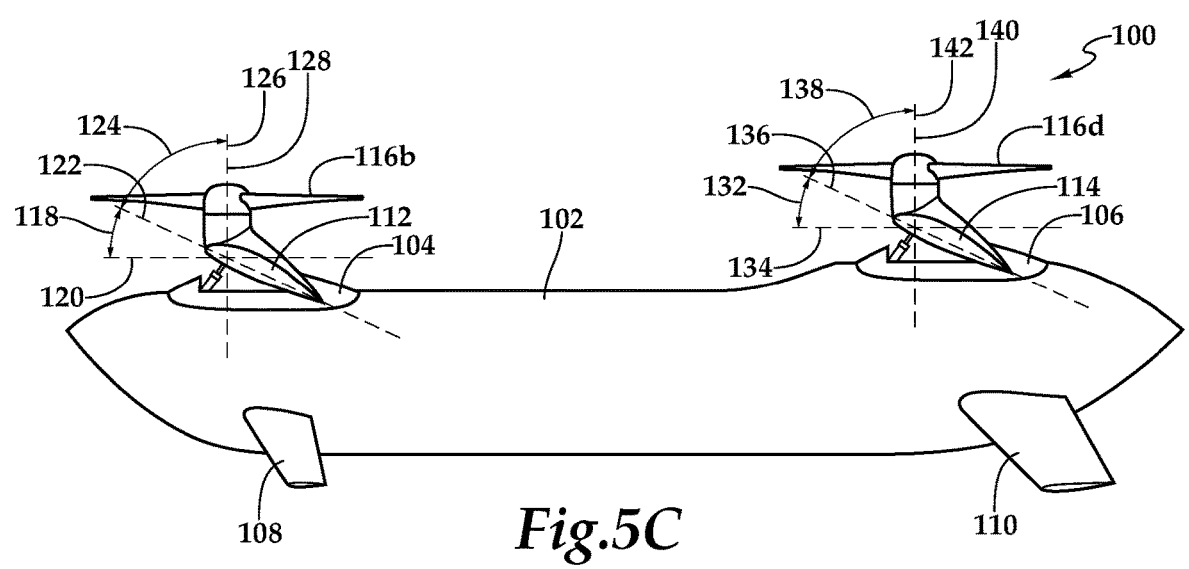
Figure 5F:
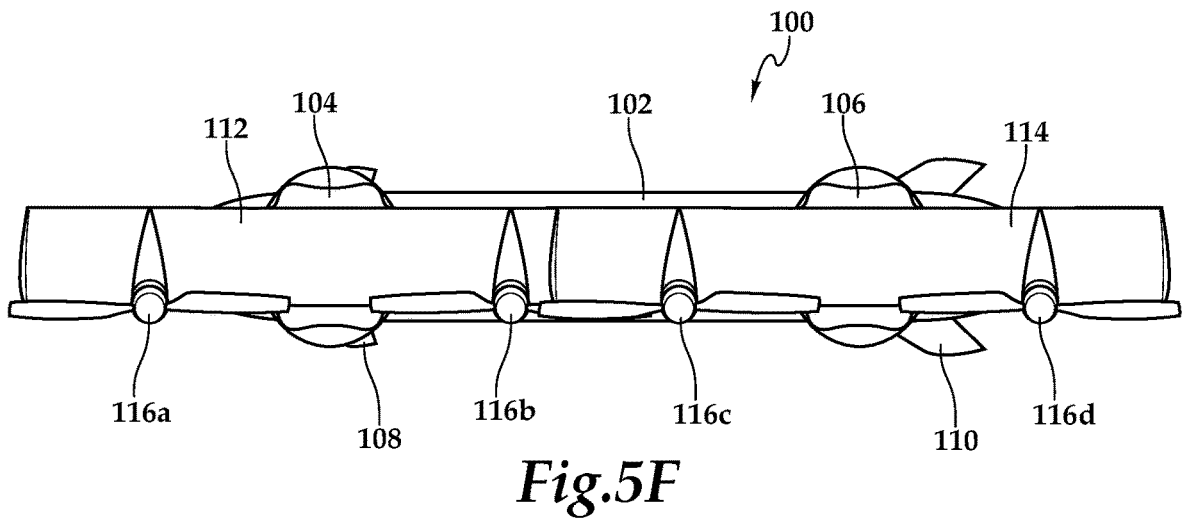
Figure 5E:
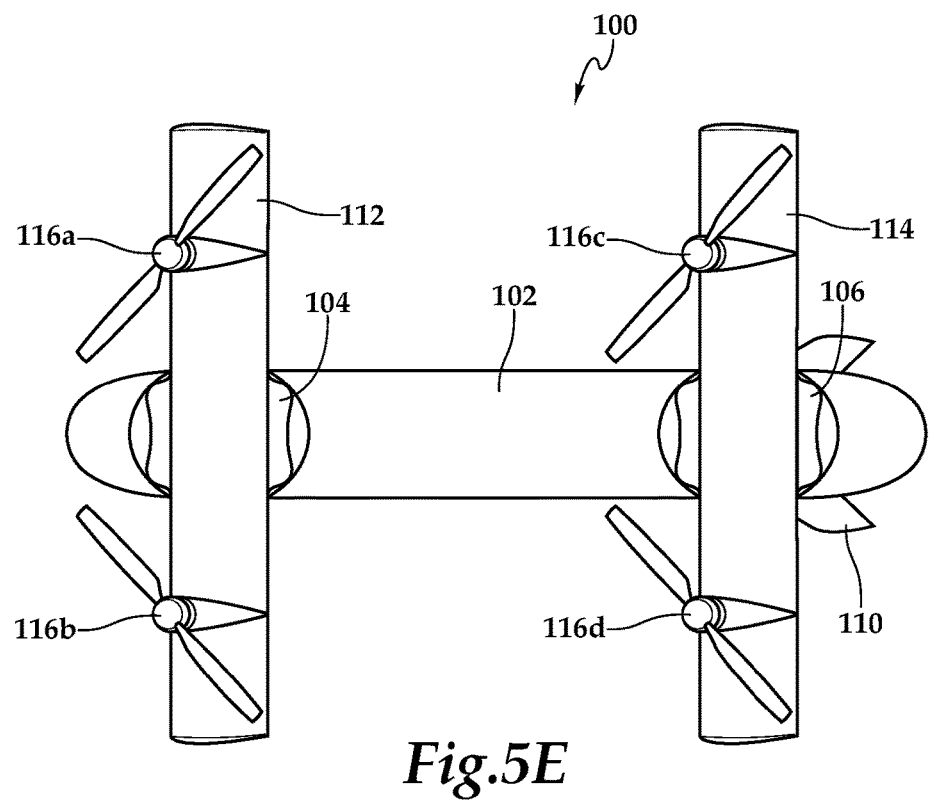
Figure 5H:
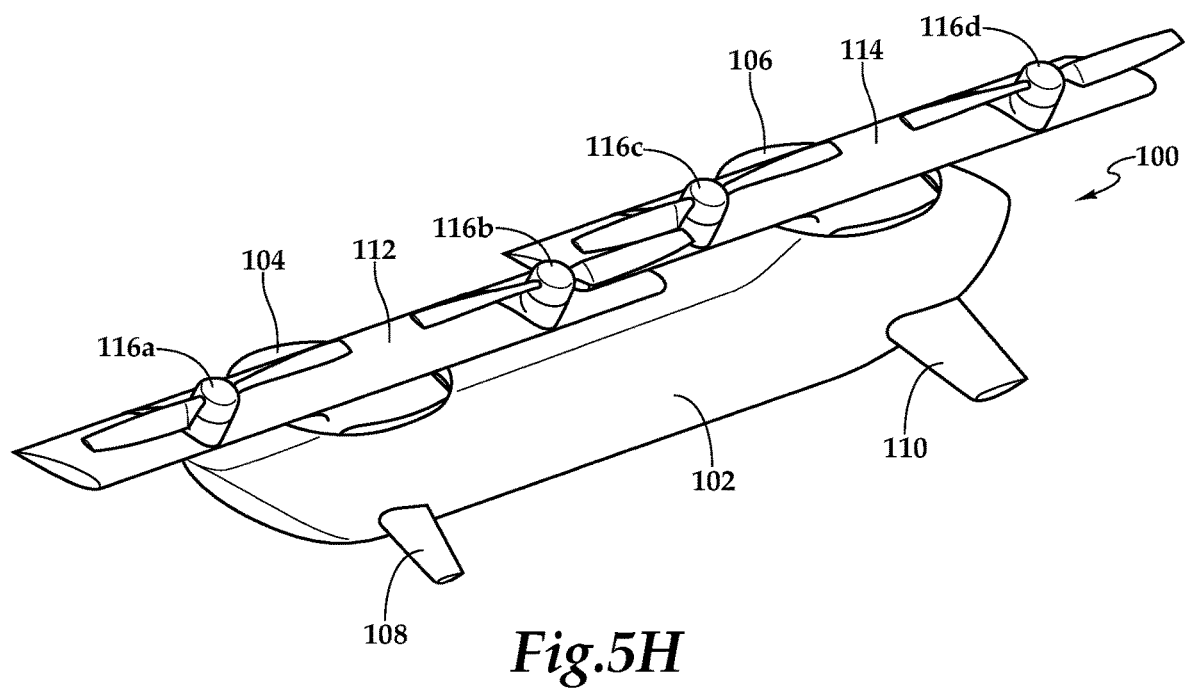
Figure 5G:
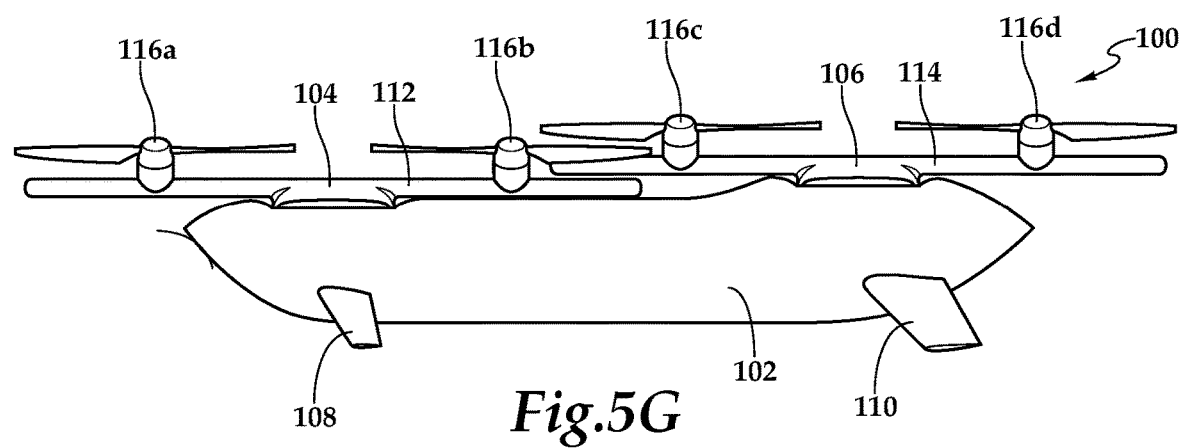

Referring to FIGS. 5A-5H in the drawings, a variable incidence wing aircraft having a VTOL flight mode, a forward flight mode and a wing stowage mode is schematically illustrated and generally designated 100. Aircraft 100 includes a fuselage 102, a forward wing mount assembly 104 and an aft wing mount assembly 106 each of which is rotatable relative to fuselage 102, forewings 108 that provide static and dynamic stability to aircraft 100 and a tail assembly 110 having optional control surfaces for horizontal and/or vertical stabilization of aircraft 100. A forward wing 112 is supported by forward wing mount assembly 104 and rotates therewith relative to fuselage 102 such that forward wing 112 has a substantially perpendicular orientation relative to fuselage 102, as best seen in FIGS. 5A-5E, for the flight modes of aircraft 100 and a substantially parallel orientation relative to fuselage 102, as best seen in FIGS. 5F-5H, for the wing stowage mode of aircraft 100. Similarly, an aft wing 114 is supported by aft wing mount assembly 106 and rotates therewith relative to fuselage 102 such that aft wing 114 has a substantially perpendicular orientation relative to fuselage 102, as best seen in FIGS. 5A-5E, for the flight modes of aircraft 100 and a substantially parallel orientation relative to fuselage 102, as best seen in FIGS. 5F-5H, for the wing stowage mode of aircraft 100. A pair of forward propulsion assemblies 116a, 116b are coupled to forward wing 112 and a pair of aft propulsion assemblies 116c, 116d are coupled to aft wing 114. In this configuration, propulsion assemblies 116a, 116b, 116c, 116d form a two-dimensional distributed thrust array which provides enhanced pitch control over aircraft 100 and an enhanced center of gravity range for aircraft 100. In addition, as best seen in FIGS. 5C-5D, aft propulsion assemblies 116c, 116d are positioned higher than forward propulsion assemblies 116a, 116b to assure that aft propulsion assemblies 116c, 116d have clean air to hover and to cruise more efficiently. Even though aircraft 100 has been described and depicted as having four propulsion assemblies 116a, 116b, 116c, 116d each having a rotor assembly with the same diameter, it should be understood by those having ordinary skill in the art that a variable incidence wing aircraft of the present disclosure could have other numbers of propulsion assemblies both greater than or less than four including, for example, having a greater number of aft propulsion assemblies that forward propulsion assemblies and/or having rotor assemblies of different diameters such as the aft rotor assemblies having a larger diameter than the forward rotor assemblies.

Each of propulsion assemblies 116a, 116b has an axis of rotation that is fixed relative to a chord axis of wing 112 and each of propulsion assemblies 116c, 116d has an axis of rotation that is fixed relative to a chord axis of wing 114. Wings 112, 114 are pivotable between a VTOL orientation, as best see FIGS. 5A and 5C, and a forward flight orientation, as best seen in FIGS. 5B and 5D. In the illustrated embodiment, wings 112, 114 have the same incidence angle relative to fuselage 102 in the forward flight orientation. In other embodiments, the incidence angle of wings 112 may be greater than the incidence angle of wing 114 in the forward flight orientation to optimize the stall characteristics of aircraft 100. As best seen in FIGS. 5C-5D, wing 112 is pivoted through a pivot angle 118 of approximately twenty-five degrees between the VTOL orientation (see FIG. 5C) and forward flight orientation (see FIG. 5D). In other embodiments, pivot angle 118 may be in the range of twenty to thirty degrees or other suitable pivot angle. In the illustrated embodiment, the incident angle of wing 112 relative to fuselage 102 is zero in the forward flight orientation such that a horizontal axis 120, which is parallel to the longitudinal axis of aircraft 100, is common with a chord axis 122 of wing 112, as best seen in FIG. 5D. The angle 124 between the axis of rotation 126 of propulsion assembly 116b and chord axis 122 of wing 112 is approximately sixty-five degrees. In other embodiments, angle 124 may be greater than or less than sixty-five degrees depending upon the incident angle of wing 112 relative to fuselage 102 in the forward flight orientation and pivot angle 118. As illustrated in FIG. 5C, in the VTOL orientation, the axis of rotation 126 of propulsion system 116b is preferably coincident with the vertical axis 128. This results in a forward angle 130 of the axis of rotation 126 of propulsion system 116b relative to the vertical axis 128 that is congruent with pivot angle 118, which is approximately twenty-five degrees in the present example. In this manner, the thrust provided by propulsion system 116b is substantially vertical in the VTOL orientation and the thrust provided by propulsion system 116b in the forward flight orientation has a forward component that enables forward flight of aircraft 100.

Similarly, wing 114 is pivoted through a pivot angle 132 of approximately twenty-five degrees between the VTOL orientation (see FIG. 5C) and forward flight orientation (see FIG. 5D). In other embodiments, pivot angle 132 may be in the range of twenty to thirty degrees or other suitable pivot angle. In the illustrated embodiment, the incident angle of wing 114 relative to fuselage 102 is zero in the forward flight orientation such that a horizontal axis 134, which is parallel to the longitudinal axis of aircraft 100, is common with a chord axis 136 of wing 114, as best seen in FIG. 5D. The angle 138 between the axis of rotation 140 of propulsion assembly 116d and chord axis 136 of wing 114 is approximately sixty-five degrees. In other embodiments, angle 138 may be greater than or less than sixty-five degrees depending upon the incident angle of wing 114 relative to fuselage 102 in the forward flight orientation and pivot angle 132. As illustrated in FIG. 5C, in the VTOL orientation, the axis of rotation 140 of propulsion system 116d is preferably coincident with the vertical axis 142. This results in a forward angle 144 of the axis of rotation 140 of propulsion system 116d relative to the vertical axis 142 that is congruent with pivot angle 132, which is approximately twenty-five degrees in the present example. In this manner, the thrust provided by propulsion system 116d is substantially vertical in the VTOL orientation and the thrust provided by propulsion system 116d in the forward flight orientation has a forward component that enables forward flight of aircraft 100. Pivoting operations of wings 112, 114 are controlled by the flight control system of aircraft 100 which is configured to pivot wings 112, 114 independently. For example, wings 112, 114 may be pivoted at the same time with the same pivot rate, at the same time but with different pivot rates or sequentially wherein one of wings 112, 114 is pivoted before the other of wings 112, 114.

As best seen in of FIGS. 5E-5F, responsive to power from the battery system and sequencing instructions from the flight control system of aircraft 100, wing stowage actuators (not visible) are configured to rotate wings 112, 114 between the flight modes of aircraft 100, substantially perpendicular to fuselage 102 (see FIG. 5E) and the stowage mode of aircraft 100, substantially parallel to fuselage 102 (see FIG. 5F). In the illustrated embodiment, wings 112, 114 are rotated through a wing stowage angle of approximately ninety degrees. In the stowage mode of aircraft 100, the footprint of aircraft 100 is significantly reduced enabling, for example, transportation of aircraft 100 in a shipping container. As best seen in of FIGS. 5G-5H, wing 114 is at a higher water line than wing 112 such that wing 114 is above wing 112 in the flight modes and importantly in the stowage mode of aircraft 100 such that a portion of wing 114 is nested above a portion of wing 112 in the stowage configuration. As illustrated, the rotor blades of propulsion assemblies 116a, 116b are preferably clocked to be substantially parallel with wing 112 and the rotor blades of propulsion assemblies 116c, 116c are preferably clocked to be substantially parallel with wing 114 in the stowage mode of aircraft 10.

Figure 6A:
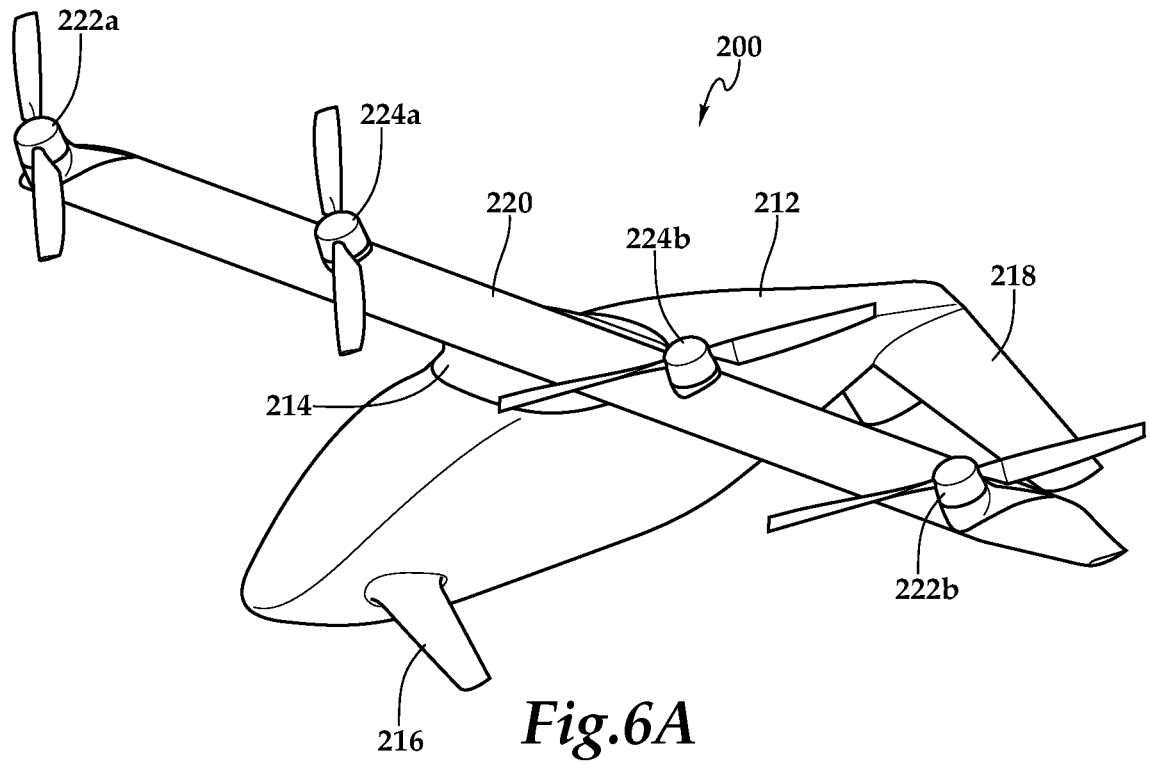
FIGS. 6A-6B are schematic illustrations of exemplary variable incidence wing aircraft having a VTOL flight mode, a forward flight mode and a wing stowage mode in accordance with additional embodiments of the present disclosure.
Figure 6B:
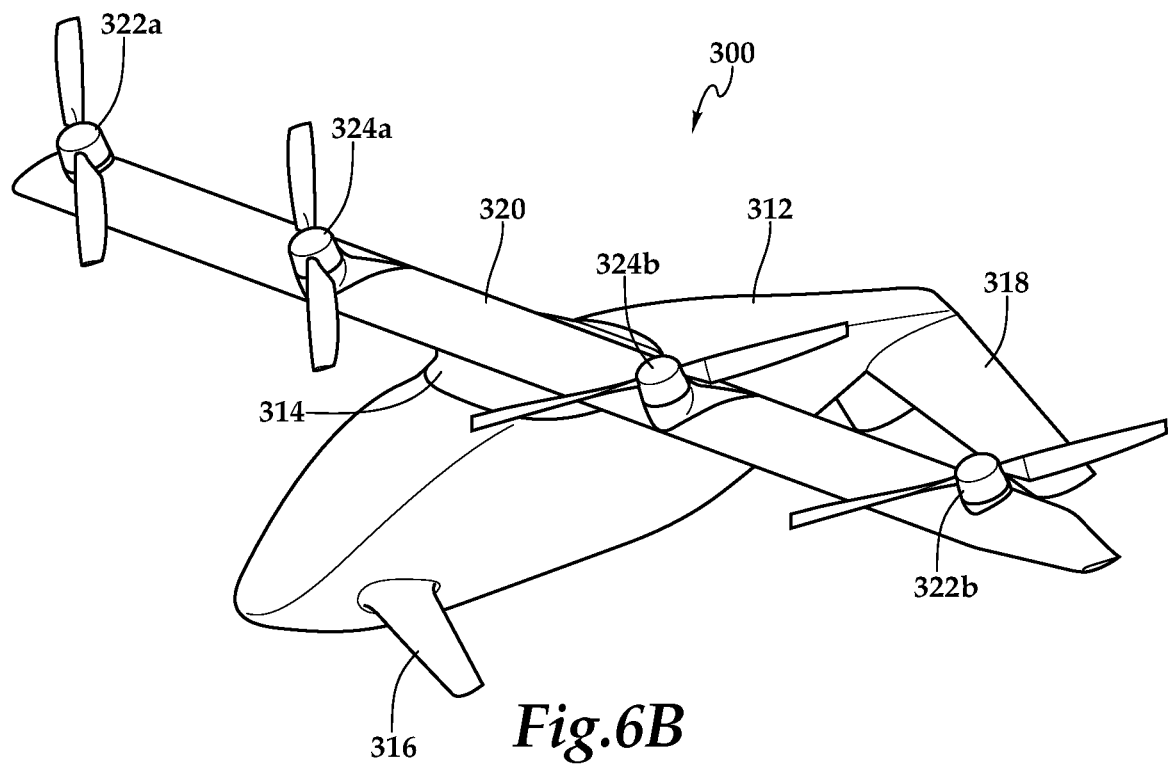

Referring to FIGS. 6A-6B in the drawings, additional embodiments of a variable incidence wing aircraft having a VTOL flight mode, a forward flight mode and a wing stowage mode are depicted. In FIG. 6A, aircraft 200 includes a fuselage 212, a wing mount assembly 214 that is rotatable relative to fuselage 212, forewings 216 that provide static and dynamic stability to aircraft 200 and a tail assembly 218 having optional control surfaces for horizontal and/or vertical stabilization of aircraft 200. A wing 220 is supported by wing mount assembly 214 and rotates with wing mount assembly 214 relative to fuselage 212 such that wing 220 has a substantially perpendicular orientation relative to fuselage 212, for the flight modes of aircraft 200 and a substantially parallel orientation relative to fuselage 212, for the wing stowage mode of aircraft 200. Located at outboard stations of wing 220 are outboard propulsion assemblies 222a, 222b. Located at inboard stations of wing 220 are inboard propulsion assemblies 224a, 224b. In this configuration, propulsion assemblies 222a, 222b, 224a, 224b form a two-dimensional distributed thrust array as outboard propulsion assemblies 222a, 222b are located at forward portions of wing 220 and inboard propulsion assemblies 224a, 224b are located at aft portions of wing 220. Staggering the propulsion assemblies in this manner provides certain benefits for pitch control over aircraft 200. The pivoting and rotating operations of the wing assembly of aircraft 200 are substantially similar to that described herein with reference to wing assembly 24 of aircraft 10.

In FIG. 6B, aircraft 300 includes a fuselage 312, a wing mount assembly 314 that is rotatable relative to fuselage 312, forewings 316 that provide static and dynamic stability to aircraft 300 and a tail assembly 318 having optional control surfaces for horizontal and/or vertical stabilization of aircraft 300. A wing 320 is supported by wing mount assembly 314 and rotates with wing mount assembly 314 relative to fuselage 312 such that wing 320 has a substantially perpendicular orientation relative to fuselage 312, for the flight modes of aircraft 300 and a substantially parallel orientation relative to fuselage 312, for the wing stowage mode of aircraft 300. Located at outboard stations of wing 320 are outboard propulsion assemblies 322a, 322b. Located at inboard stations of wing 320 are inboard propulsion assemblies 324a, 324b. In this configuration, propulsion assemblies 322a, 322b, 324a, 324b form a two-dimensional distributed thrust array as outboard propulsion assemblies 322a, 322b are located at aft portions of wing 320 and inboard propulsion assemblies 324a, 324b are located at forward portions of wing 320. Staggering the propulsion assemblies in this manner provides certain benefits for pitch control over aircraft 300. The pivoting and rotating operations of the wing assembly of aircraft 300 are substantially similar to that described herein with reference to wing assembly 24 of aircraft 10.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. An aircraft having a VTOL flight mode, a forward flight mode and a wing stowage mode, the aircraft comprising:
   a fuselage; and
   a wing assembly rotatably mounted to the fuselage, the wing assembly rotatable between a substantially perpendicular orientation relative to the fuselage in the flight modes and a substantially parallel orientation relative to the fuselage in the wing stowage mode, the wing assembly comprising:
   a wing pivotable between a forward flight orientation, at a first incidence angle relative to the fuselage, and a VTOL orientation, at a second incidence angle relative to the fuselage that is greater than the first incident angle by a pivot angle, the wing having a chord axis; and a distributed thrust array coupled to the wing, the thrust array including at least two outboard propulsion assemblies and at least two inboard propulsion assemblies, each of the propulsion assemblies having an axis of rotation that has a fixed non-zero angle relative to the chord axis;

wherein, in the VTOL flight mode, the axis of rotation of each of the propulsion assemblies is substantially vertical and the wing is in the VTOL orientation; and wherein, in the forward flight mode, the wing is in the forward flight orientation and the axis of rotation of each of the propulsion assemblies is tilted forward from the vertical by the pivot angle.

2. The aircraft as recited in claim 1 wherein the pivot angle is between twenty and thirty degrees.

3. The aircraft as recited in claim 1 wherein the pivot angle is between twenty-four and twenty-six degrees.

4. The aircraft as recited in claim 1 wherein the thrust array forms a one-dimensional thrust array.

5. The aircraft as recited in claim 1 wherein the thrust array forms a two-dimensional thrust array.

6. The aircraft as recited in claim 5 wherein the outboard propulsion assemblies are forward of the inboard propulsion assemblies.

7. The aircraft as recited in claim 5 wherein the inboard propulsion assemblies are forward of the outboard propulsion assemblies.

8. The aircraft as recited in claim 1 wherein each of the propulsion assemblies further comprises an electric motor and a rotor assembly with two fixed pitch rotor blades operable to change thrust output responsive to changes in rotational speed.

9. The aircraft as recited in claim 8 wherein each of the rotor blades is substantially parallel with the wing in the wing stowage mode.

10. The aircraft as recited in claim 1 further comprising a flight control system configured to independently control each of the propulsion assemblies and configured to control pivoting of the wing between the VTOL orientation and the forward flight orientation.

11. A variable incidence wing aircraft comprising:

a fuselage; and a wing rotatably relative to the fuselage between a substantially perpendicular orientation relative to the fuselage in flight modes and a substantially parallel orientation relative to the fuselage in a wing stowage mode, the wing pivotable relative to the fuselage between a first incidence angle in a forward flight orientation and a second incidence angle in a VTOL orientation, the second incidence angle greater than the first incident angle by a pivot angle, the wing having a chord axis; and a distributed thrust array coupled to the wing, the thrust array including at least two propulsion assemblies each having an axis of rotation that has a fixed non-zero angle relative to the chord axis such that when the wing is in the VTOL orientation, the axis of rotation of each propulsion assembly is substantially vertical to provide vertical thrust and such that when the wing is in the forward flight orientation, the axis of rotation of each propulsion assembly is tilted forward from the vertical by the pivot angle to provide both vertical thrust and forward thrust.

12. The aircraft as recited in claim 11 wherein, the first incidence angle is between zero degrees and ten degrees; and wherein, the second incidence angle is between twenty degrees and forty degrees.

13. The aircraft as recited in claim 11 wherein, the first incidence angle is between zero degrees and ten degrees; and wherein, the second incidence angle is between twenty-five degrees and thirty-five degrees.

14. The aircraft as recited in claim 11 wherein, the fixed non-zero angle between the axis of rotation of each propulsion assembly and the chord axis of the wing is between fifty degrees and seventy degrees.

15. The aircraft as recited in claim 11 wherein, the fixed non-zero angle between the axis of rotation of each propulsion assembly and the chord axis of the wing is between fifty-five degrees and sixty-five degrees.

16. The aircraft as recited in claim 11 wherein, the pivot angle is between twenty and thirty degrees.

17. The aircraft as recited in claim 11 wherein, the thrust array forms a one-dimensional thrust array.

18. The aircraft as recited in claim 11 wherein, the thrust array forms a two-dimensional thrust array.

19. The aircraft as recited in claim 11 wherein, the thrust array includes at least four propulsion assemblies.

20. The aircraft as recited in claim 19 wherein, the at least four propulsion assemblies include at least two outboard propulsion assemblies and at least two inboard propulsion assemblies.

* * * * *